US012704987B2

(12) United States Patent
Gao et al.

(10) Patent No.: US 12,704,987 B2

(45) Date of Patent: Aug. 11, 2026

(54) STORAGE SYSTEM, FILE STORAGE AND READING METHOD, AND TERMINAL DEVICE

(71) Applicant: Huawei Technologies Co., Ltd., Shenzhen (CN)

(72) Inventors: Enbo Gao, Shanghai (CN); Juanjuan Tong, Shanghai (CN); Xiyu Zhou, Shanghai (CN); Wei Du, Moscow (RU); Zhiwei Zhang, Shanghai (CN); Jian Yi, Shanghai (CN); Weilai Zhou, Shanghai (CN); Jiaxin Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 41 days.

(21) Appl. No.: 17/914,200

(22) PCT Filed: Mar. 24, 2021

(86) PCT No.: PCT/CN2021/082695
§ 371 (c)(1),
(2) Date: Sep. 23, 2022

(87) PCT Pub. No.: WO2021/190555
PCT Pub. Date: Sep. 30, 2021

(65) Prior Publication Data

US 2023/0120862 A1 Apr. 20, 2023

(30) Foreign Application Priority Data

Mar. 25, 2020 (CN) ......................... 202010219526.4

(51) Int. Cl.
*G06F 3/06* (2006.01)

(52) U.S. Cl.
CPC .......... *G06F 3/0647* (2013.01); *G06F 3/0622* (2013.01); *G06F 3/0658* (2013.01); *G06F 3/0679* (2013.01)

(58) Field of Classification Search
None
See application file for complete search history.

(56) References Cited

U.S. PATENT DOCUMENTS 6,298,386 B1 * 10/2001 Vahalia ................. G06F 16/183 709/213
7,930,476 B1 * 4/2011 Castelli ................. G06F 9/5011 711/170

(Continued)

FOREIGN PATENT DOCUMENTS

CN 101398749 A 4/2009
CN 101727503 A 6/2010

(Continued)

OTHER PUBLICATIONS

Kwon, K. et al., "An Advanced SLC-buffering for TLC NAND Flash-based Storage," IEEE Transactions on Consumer Electronics, vol. 63, No. 4, Nov. 2017, doi: 10.1109/TCE.2017.015070, pp. 459-466.

(Continued)

*Primary Examiner* — Hosain T Alam
*Assistant Examiner* — Ryan Dare
(74) *Attorney, Agent, or Firm* — Slater Matsil, LLP

(57) ABSTRACT

A storage system, a file storage and reading method, and a terminal device are provided. A storage system including a UFS is used as an example. The storage system configures different medium forms of the UFS, for example, configures persistent storage space of the UFS including SLC and TLC medium forms, to implement hybrid medium multi-disk storage. Based on the storage system, a hot file related to an application running rate is preferentially selected and stored (Continued)

in an SLC storage area of the UFS, and files on a mapped multi-disk are mounted on a same directory of a file system, so that files can be migrated between the SLC storage area and a TLC storage area without user perception, to improve performance of the storage system.

20 Claims, 8 Drawing Sheets

(56) References Cited

U.S. PATENT DOCUMENTS 8,433,674 B2* 4/2013 Takata .................. G06F 3/0649 707/688
10,854,290 B1* 12/2020 Wu ..................... G11C 11/5628
2003/0140207 A1 7/2003 Nagase et al.
2008/0215800 A1* 9/2008 Lee ..................... G06F 12/1416 711/E12.098
2009/0049234 A1 2/2009 Oh et al.
2009/0259799 A1* 10/2009 Wong .................. G06F 12/0246 711/E12.008
2010/0017564 A1 1/2010 Heo et al.
2011/0106863 A1* 5/2011 Mamidi ................ G06F 16/185 707/823
2014/0149473 A1* 5/2014 Kim .................... G06F 16/1847 707/824
2015/0160872 A1 6/2015 Chen
2015/0205680 A1 7/2015 Kimmel et al.
2018/0067648 A1 3/2018 Lin et al.
2019/0018594 A1* 1/2019 Hong .................... G06F 3/0679
2022/0374216 A1* 11/2022 Sugawara ............. G06F 3/0604

FOREIGN PATENT DOCUMENTS

CN 103400598 A 11/2013
CN 103677654 A 3/2014
CN 103902474 A * 7/2014
CN 103914360 A 7/2014
CN 103942151 A 7/2014
CN 104809076 A 7/2015
CN 104850301 A * 8/2015
CN 105045523 A 11/2015
CN 105447062 A 3/2016
CN 105554069 A 5/2016
CN 106202070 A 12/2016
CN 107102814 A 8/2017
CN 107943713 A 4/2018
CN 108073458 A 5/2018
CN 108804344 A 11/2018
CN 109947358 A 6/2019
CN 110083573 A 8/2019
CN 110795027 A 2/2020
CN 110795360 A 2/2020
CN 111506262 A 8/2020
WO 2019083389 A1 5/2019

OTHER PUBLICATIONS

Shi Wei, "Research on Storage Optimizations and Applied Technologies Based on Flash Characteristics", Jul. 2016, 2 pages.

* cited by examiner

STORAGE SYSTEM, FILE STORAGE AND READING METHOD, AND TERMINAL DEVICE

CROSS-REFERENCE TO RELATED APPLICATIONS

This application is a national stage of International Application No. PCT/CN2021/082695, filed on Mar. 24, 2021, which claims priority to Chinese Patent Application No. 202010219526.4, filed on Mar. 25, 2020. Both of the aforementioned applications are hereby incorporated by reference in their entireties.

TECHNICAL FIELD

This application relates to the field of electronic technologies, and in particular, to a hybrid medium multi-disk storage system, a file storage and reading method, and a terminal device.

BACKGROUND

A storage device is usually built in an existing terminal device, to expand storage space of the terminal device. Different medium types for configuring the storage device correspond to different storage areas, and the different storage areas are used to store data of different types, so that in a running process of the terminal device, hybrid medium multi-disk storage is implemented, and storage performance of the terminal device is improved.

For example, a plurality of storage devices such as a solid state drive (solid state drive, SSD) or a hard disk drive (hard disk drive, HDD) are usually built in a fixed terminal such as a personal computer (personal computer, PC). Based on a performance difference between the storage devices, hybrid medium multi-disk storage is implemented, to improve storage performance.

A single storage device such as a universal flash storage (universal flash storage, UFS) or an embedded multimedia card (embedded multimedia card, eMMC) is usually built in a mobile terminal such as a mobile phone. Because the mobile terminal such as the mobile phone is light and thin, compact, and portable, and has narrow structure space, only a single storage device can be built in the mobile terminal usually, and the single storage device is usually configured to be in a storage form with a large capacity. As a user requirement increases, increasingly more data needs to be stored. If storage space of the storage device meets a requirement, performance cannot meet a use requirement of a user.

SUMMARY

This application provides a storage system, a file storage and reading method, and a terminal device, to implement hybrid medium multi-disk storage when a capacity, performance, and a service life of the storage system are considered.

According to a first aspect, a storage method is provided. The method is applied to an electronic device including a processor and a universal flash storage UFS, and the method includes: configuring a data storage form of a first logical unit in the UFS as a first storage form and a data storage form of a second logical unit in the UFS as a second storage form, where the first logical unit and the second logical unit are mounted on a same directory of a file system, the first storage form is different from the second storage form, and read/write performance of the second storage form is higher than read/write performance of the first storage form; and determining first information in response to a request for creating a new file, selecting the first logical unit or the second logical unit based on the first information, and creating the new file in the selected logical unit.

For example, in this embodiment of this application, the second logical unit is configured as a particle medium having higher read/write performance than the first logical unit. In other words, the second logical unit in the second storage form has higher read/write performance than the first logical unit in the first storage form. For example, storage space of the UFS is configured to include a second logical unit in an SLC storage form and a first logical unit in a TLC storage form.

It should be understood that, in this embodiment of this application, a configured SLC storage area (the second logical unit) is a persistent storage area. The SLC storage area is equivalent to a part of fixed storage obtained by dividing an original conventional storage area (TLC storage area), and is a part of storage of a terminal device. Data stored in the SLC storage area continues to be retained after a power failure.

In this embodiment of this application, a high-speed storage area in an SLC storage form is configured, so that the processor can directly create a file into the SLC storage area, and can read the file from the SLC storage area. This avoids a case in which the file can be created into the conventional storage area (TLC storage area) only through a cache (cache) for persistent storage. Because performance and a service life of an SLC medium are far higher than those of a TLC medium, a storage system provided in embodiments of this application can improve data read/write performance, and can prolong a service life of the storage system.

It should be understood that in this embodiment of this application, disks to which the SLC storage area and the TLC storage area are mapped are mounted on the same directory of the file system. Therefore, a file of an application may be migrated between the SLC storage area and the TLC storage area. For a user, a user does not need to perceive the migration process, and use of the user is not affected.

It should be understood that the new file herein may be various files obtained when an application installation package is decompressed, compiled, and the like.

A process in which the system creates the new file may correspond to different implementation processes. For example, the system may open a buffer through an open interface, perform different results based on parameters, and create a file if there is no file. For example, content of the new file is written through a write interface, and the new file is closed through a close interface.

In a possible implementation, in a process of creating the new file into the file system, when the new file needs to be created into an SLC storage area (a high-speed storage area), the system may first invoke an open interface or a create interface to create the new file and obtain a descriptor fd of the new file; then invoke an ioctl interface to input a parameter to specify that content of the new file needs to be flushed to a disk to which the SLC storage area is mapped; and invoke a write interface to write the content of the new file to a memory buffer corresponding to the descriptor fd, and invoke a close interface to close the descriptor fd of the new file; and finally, the kernel file system flushes data in the memory back to the high-speed storage area of the disk on an appropriate occasion, so that the content of the new file is actually flushed to the disk.

In a process of creating the new file into the file system, when the new file needs to be created into a TLC storage area (a conventional storage area), the system may first invoke an open interface or a create interface to create the new file and obtain a descriptor fd of the new file; then invoke an ioctl interface to input a parameter to specify that content of the new file needs to be flushed to a slow disk to which the TLC storage area is mapped; and invoke a write interface to write the content of the new file to a memory buffer corresponding to the descriptor fd, and invoke a close interface to close a file descriptor, that is, the descriptor fd of the new file; and finally, the kernel file system flushes data in the memory back to the conventional storage area of the disk on an appropriate occasion, so that the content of the new file is actually flushed to the disk.

It should be understood that the process described above is a possible process of creating the new file and flushing the content of the new file to the disk, or may be implemented in different manners. This is not limited in this embodiment of this application. In this embodiment of this application, the interface invoked by the system does not include information about any logical unit LU. For a user, interfaces for accessing files by various applications do not need to be changed.

It should be further understood that, in this embodiment of this application, for files of each application, different files are distinguished according to different rules, and then the different files are separately created into the SLC storage area and the TLC storage area of the UFS, to meet requirements on performance and a storage capacity in different scenarios.

Optionally, the request message for creating the new file may include machine learning data or information about a preset data table. A host may obtain the machine learning data or the information about the preset data table based on the received request message. The machine learning data or the information about the preset data table may list a plurality of hot applications or hot files of an application, so that the host can determine whether an application currently to be installed by a user is a hot application or which files in the application are hot files. Alternatively, the host may obtain the machine learning data or the information about the preset data table in another possible manner. This is not limited in this embodiment of this application.

With reference to the first aspect, in some implementations of the first aspect, the first information includes file type information of the new file.

Optionally, the host may obtain the machine learning data or the information about the preset data table, where the request message for creating the new file may further include the file type information of the new file. The host may choose, based on the machine learning data or the information about the preset data table and the file type information of the new file, to create the new file into the first logical unit or the second logical unit.

With reference to the first aspect and the foregoing implementations, in some implementations of the first aspect, the first information includes information about a directory to which the new file belongs; or when the new file is used as a directory file, the first information includes information about the directory file.

It should be understood that the information about the directory to which the new file belongs or the information about the new file used as the directory file may also be included in the request message for creating the new file that is received by the host 30. This is not limited in this embodiment of this application.

With reference to the first aspect and the foregoing implementations, in some implementations of the first aspect, the first information includes information about an application to which the new file belongs. With reference to the first aspect and the foregoing implementations, in some implementations of the first aspect, the information about the application to which the new file belongs includes an application package name corresponding to the application to which the new file belongs.

Optionally, during installation of an application, for example, when the user downloads the application from an application store, a storage unit for file creation is determined according to a preset rule. For example, the application store indicates a directory to which a file of the application belongs. When a to-be-created new file is a hot file, the host creates the new file into the second logical unit when creating the new file.

In another possible implementation, the host may select the first logical unit or the second logical unit based on the application to which the new file belongs. For example, the application store indicates a range of a hot application. When a to-be-created new file belongs to a hot application, the host creates the new file into the second logical unit when creating the new file.

Optionally, the host 30 may determine, based on a package name of a currently installed APP, a file to be written to the high-speed storage area.

For example, in this embodiment of this application, when an application (application, APP) is installed or the APP is run, frequencies at which the processor reads various files of the APP are different. A frequency threshold may be set in descending order of frequencies at which the processor reads various files of the APP. A file whose read frequency of the processor is greater than or equal to the frequency threshold is referred to as a “hot file”. In addition, this type of hot file is written to the SLC storage area, and other files of the APP may be written to the TLC storage area, or other files of the APP are written to some files with a high read frequency in descending order of read frequencies of the processor based on a remaining capacity of the SLC storage area. In this way, a data reading rate can be improved based on high performance of the high-speed storage area, to improve a running rate of the APP and improve user experience.

For example, if the processor writes a file of an APP whose package name is PKG to the SLC storage area, a running rate of the APP can be improved based on high performance of the SLC storage area, to improve user experience. Another related file of the APP is created into the TLC storage area, to avoid invalid occupation of the SLC storage area by this type of file, save more space of the SLC storage area for another application, improve a running rate of the another application, and improve user experience. In addition, in the method, the file written to the SLC storage area only needs to be determined based on the package name of the APP, and access time or access frequency information of any file does not need to be stored. Therefore, an implementation process is more convenient.

With reference to the first aspect and the foregoing implementations, in some implementations of the first aspect, the method further includes: based on popularity of accessing a file in the file system by the processor, migrating a file in the first logical unit to the second logical unit, and/or migrating a file in the second logical unit to the first logical unit.

It should be understood that, for files that have been created into the SLC storage area and the TLC storage area, in a subsequent use process of a mobile phone, for different application scenarios, frequencies at which the files in the two storage areas are read by the host change. The files in the SLC storage area and the TLC storage area cannot need to be adjusted without affecting normal use by the user.

With reference to the first aspect and the foregoing implementations, in some implementations of the first aspect, the file in the first logical unit is migrated to the second logical unit when a frequency at which the processor accesses the file in the first logical unit is greater than or equal to a first threshold; and/or the file in the second logical unit is migrated to the first logical unit when a frequency at which the processor accesses the file in the second logical unit is less than or equal to the first threshold.

With reference to the first aspect and the foregoing implementations, in some implementations of the first aspect, the method further includes: obtaining information about a quantity of applications installed by a user; and when the quantity of applications installed by the user is less than a second threshold, migrating the file in the first logical unit to the second logical unit; or when the total quantity of applications installed by the user is greater than or equal to the second threshold, arranging the applications installed by the user in descending order of use frequencies of the user, determining hot files of first K applications in descending order of use frequencies of the user based on a capacity of the second logical unit, and migrating the hot files of the first K applications to the second logical unit, where K is a positive integer.

For different users, different quantities of APPs are installed on mobile phones. The users can be grouped into different groups based on quantities of APPs installed by the users. When user privacy is ensured, the processor may obtain quantities of applications installed by users, to group the users into different groups. A user who has installed a small quantity of APPs may directly migrate hot files of all APPs to the high-speed storage area. According to the method, the user can obtain performance gains of the SLC storage area as soon as possible. A user who has installed a large quantity of APPs installs a large quantity of APPs. In this case, a hot file of a frequently used APP may be directly created into the SLC storage area based on frequencies at which the user has used various APPs. According to the method, for an APP frequently used by the user, performance gains of the high-speed storage area can be obtained, and user experience can be improved.

With reference to the first aspect and the foregoing implementations, in some implementations of the first aspect, when the hot files of the first K applications in the applications installed by the user have been created in the second logical unit, and the capacity of the second logical unit is greater than or equal to a third threshold, the method further includes: obtaining N applications other than the first K applications in the applications installed by the user, traversing different files of the N applications, and determining M file sets, where each of the M file sets includes at least one file of the N applications; calculating M corresponding time gains of separately creating the M file sets into the second logical unit, where the time gains are relative time gains or absolute time gains; determining M impact coefficients of the M file sets based on the M file sets and the M corresponding time gains; and arranging the M impact coefficients in descending order, determining first S impact coefficients from the M impact coefficients based on the capacity of the second logical unit and sizes of the M file sets, and creating, into the second logical unit, S file sets corresponding to the S impact coefficients.

With reference to the first aspect and the foregoing implementations, in some implementations of the first aspect, an occasion of migrating the file in the first logical unit to the second logical unit and/or migrating the file in the second logical unit to the first logical unit is: The electronic device is currently in an idle state; and/or a system optimization request of the user is received; and/or the capacity of the second logical unit is greater than or equal to a fourth threshold.

Optionally, the host may select an appropriate occasion to adjust a file in the TLC storage area and a file in the SLC storage area. In a possible implementation, when a mobile phone is in a scenario in which the mobile phone is idle and is not used, the host migrates, based on a daily use habit of the user, a file created in the TLC storage area and a file created in the SLC storage area.

It should be understood that an "idle state" in this embodiment of this application may be an unused state in which the device is in a charging state or a screen-off state. In addition, when it is determined that the device is in the charging state, or duration in which a screen of the device is off reaches preset duration, it is determined that the device is in a time period in which the device is idle and is not used, the time period is determined as the foregoing appropriate occasion, and the file created in the TLC storage area and the file created in the SLC storage area are migrated.

According to the foregoing method, personalized dynamic adjustment is performed based on a use habit of the user, and idle time in which the mobile phone is in the charging state, the screen-off state, or the like is selected to adjust a file storage area, so as to effectively manage space of the high-performance SLC storage area, ensure that a file combination with a maximum time gain is written to a limited capacity, and obtain an optimal gain improvement. In addition, the process of adjusting the storage area is imperceptible to the user, and normal use of the mobile phone by the user is not affected.

With reference to the first aspect and the foregoing implementations, in some implementations of the first aspect, the method further includes: configuring a storage form conversion mode of the second logical unit.

With reference to the first aspect and the foregoing implementations, in some implementations of the first aspect, the second logical unit is fixed in the second storage form; or when storage space of the second logical unit is less than a fifth threshold, the second logical unit unidirectionally converts from the second storage form to the first storage form; or when the storage space of the second logical unit is less than the fifth threshold, the second logical unit converts from the second storage form to the first storage form, and when the storage space of the second logical unit is greater than or equal to the fifth threshold, the second logical unit converts from the first storage form to the second storage form.

In this embodiment of this application, a conversion mode of a storage form of the SLC storage area may be further configured. For example, the SLC storage area may be configured in a unidirectional return mode in which the SLC storage area is converted from an SLC storage form to a TLC storage form in a specific condition, to meet a user requirement on a capacity of the storage system. Alternatively, the SLC storage area may be configured in a non-return mode of a permanent SLC storage form, to meet a user requirement on read/write performance of the storage system. Alternatively, the SLC storage area may be configured in a bidirectional return mode of an SLC storage form and a TLC storage form, and may be converted from the SLC storage form to the TLC storage form, and may be further converted from the TLC storage form to the SLC storage form. When the user has a higher requirement on a capacity of the storage system, the SLC storage form may be converted into the TLC storage form, to expand the capacity of the storage system. When the user has a higher requirement on performance of the storage system, the SLC storage area remains in the SLC storage form, to improve data read/write performance of the storage system. Conversion modes of a plurality of storage forms can be used in a plurality of different user scenarios to improve user experience without user perception.

With reference to the first aspect and the foregoing implementations, in some implementations of the first aspect, the first storage form includes a triple-level cell TLC, and the second storage form includes a single-level cell SLC; or the first storage form includes a multi-level cell MLC, and the second storage form includes an SLC; or the first storage form includes a quad-level cell QLC, and the second storage form includes an SLC; or the first storage form includes a TLC, and the second storage form includes an MLC; or the first storage form includes a QLC, and the second storage form includes an MLC; or the first storage form includes a QLC, and the second storage form includes a TLC.

It should be understood that the single-level cell SLC, the multi-level cell (multi-level cell, MLC), the triple-level cell TLC, and the quad-level cell (quad-level cell, QLC) are in ascending order of capacities, but are in descending order of performance and service lives.

With reference to the first aspect and the foregoing implementations, in some implementations of the first aspect, the processor sends a first instruction to a controller in the UFS, where the first instruction includes start addresses and end addresses of a plurality of logical units in the UFS. The controller in the UFS determines the first logical unit and the second logical unit in response to the first instruction based on the start addresses and the end addresses of the plurality of logical units in the UFS. The processor sends a second instruction to the controller in the UFS, and the controller in the UFS configures, in response to the second instruction, the data storage form of the first logical unit as the first storage form and the data storage form of the second logical unit as the second storage form, where the first logical unit is mapped to a common system disk, the second logical unit is mapped to a fast system disk, and files in the common system disk and the fast system disk are mounted on the same directory of the file system.

Specifically, the processor may send an instruction to the UFS, and the controller in the UFS completes, according to the instruction, the foregoing described process of configuring a logical unit, creating a file, migrating a file, or converting a storage form. Details are not described again in this embodiment of this application.

In this embodiment of this application, disks to which the high-speed storage area and the conventional storage area are mapped are mounted on the same directory of the file system, that is, files in the high-speed storage area and the conventional storage area have a same directory. Therefore, a file of an application may be migrated between the high-speed storage area and the conventional storage area. For a user, the user does not need to perceive the migration process, and use of the user is not affected.

According to a second aspect, an electronic device is provided, and includes: a configuration unit, configured to configure a data storage form of a first logical unit in a UFS to a first storage form and a data storage form of a second logical unit in the UFS to a second storage form, where the first logical unit and the second logical unit are mounted on a same directory of a file system, the first storage form is different from the second storage form, and read/write performance of the second storage form is higher than read/write performance of the first storage form; and a processing unit, configured to: determine first information in response to a request for creating a new file, select the first logical unit or the second logical unit based on the first information, and create the new file in the selected logical unit.

With reference to the second aspect, in some implementations of the second aspect, the first information includes file type information of the new file.

With reference to the second aspect and the foregoing implementations, in some implementations of the second aspect, the first information includes information about a directory to which the new file belongs; or when the new file is used as a directory file, the first information includes information about the directory file.

With reference to the second aspect and the foregoing implementations, in some implementations of the second aspect, the first information includes information about an application to which the new file belongs.

With reference to the second aspect and the foregoing implementations, in some implementations of the second aspect, the information about the application to which the new file belongs includes an application package name corresponding to the application to which the new file belongs.

With reference to the second aspect and the foregoing implementations, in some implementations of the second aspect, the processing unit is further configured to: based on popularity of accessing a file in the file system by a processor, migrate a file in the first logical unit to the second logical unit, and/or migrate a file in the second logical unit to the first logical unit.

With reference to the second aspect and the foregoing implementations, in some implementations of the second aspect, the file in the first logical unit is migrated to the second logical unit when a frequency at which the processor accesses the file in the first logical unit is greater than or equal to a first threshold; and/or the file in the second logical unit is migrated to the first logical unit when a frequency at which the processor accesses the file in the second logical unit is less than or equal to the first threshold.

With reference to the second aspect and the foregoing implementations, in some implementations of the second aspect, the electronic device further includes an obtaining unit, configured to obtain information about a quantity of applications installed by a user; and the processing unit is further configured to: when the quantity of applications installed by the user is less than a second threshold, migrate the file in the first logical unit to the second logical unit; or when the total quantity of applications installed by the user is greater than or equal to the second threshold, arrange the applications installed by the user in descending order of use frequencies of the user, determine hot files of first K applications in descending order of use frequencies of the user based on a capacity of the second logical unit, and migrate the hot files of the first K applications to the second logical unit, where K is a positive integer.

With reference to the second aspect and the foregoing implementations, in some implementations of the second aspect, when the hot files of the first K applications in the applications installed by the user have been created in the second logical unit, and the capacity of the second logical unit is greater than or equal to a third threshold, the obtaining unit is further configured to: obtain N applications other than the first K applications in the applications installed by the user, traverse different files of the N applications, and determine M file sets, where each of the M file sets includes at least one file of the N applications; and the processing unit is further configured to: calculate M corresponding time gains of separately creating the M file sets into the second logical unit, where the time gains are relative time gains or absolute time gains; determine M impact coefficients of the M file sets based on the M file sets and the M corresponding time gains; and arrange the M impact coefficients in descending order, determine first S impact coefficients from the M impact coefficients based on the capacity of the second logical unit and sizes of the M file sets, and create, into the second logical unit, S file sets corresponding to the S impact coefficients.

With reference to the second aspect and the foregoing implementations, in some implementations of the second aspect, an occasion on which the processing unit migrates the file in the first logical unit to the second logical unit, and/or migrates the file in the second logical unit to the first logical unit is: The electronic device is currently in an idle state; and/or a system optimization request of the user is received; and/or the capacity of the second logical unit is greater than or equal to a fourth threshold.

With reference to the second aspect and the foregoing implementations, in some implementations of the second aspect, the configuration unit is further configured to configure a storage form conversion mode of the second logical unit.

With reference to the second aspect and the foregoing implementations, in some implementations of the second aspect, the storage form conversion mode of the second logical unit includes any one of the following: The second logical unit is fixed in the second storage form; or when storage space of the second logical unit is less than a fifth threshold, the second logical unit unidirectionally converts from the second storage form to the first storage form; or when the storage space of the second logical unit is less than the fifth threshold, the second logical unit converts from the second storage form to the first storage form, and when the storage space of the second logical unit is greater than or equal to the fifth threshold, the second logical unit converts from the first storage form to the second storage form.

With reference to the second aspect and the foregoing implementations, in some implementations of the second aspect, the first storage form includes a triple-level cell TLC, and the second storage form includes a single-level cell SLC; or the first storage form includes a multi-level cell MLC, and the second storage form includes an SLC; or the first storage form includes a quad-level cell QLC, and the second storage form includes an SLC; or the first storage form includes a TLC, and the second storage form includes an MLC; or the first storage form includes a QLC, and the second storage form includes an MLC; or the first storage form includes a QLC, and the second storage form includes a TLC.

With reference to the second aspect and the foregoing implementations, in some implementations of the second aspect, the configuration unit is specifically configured to: receive a first instruction, where the first instruction includes start addresses and end addresses of a plurality of logical units in the UFS; determine the first logical unit and the second logical unit in response to the first instruction based on the start addresses and the end addresses of the plurality of logical units in the UFS; and receive a second instruction, and configure, in response to the second instruction, the data storage form of the first logical unit as the first storage form and the data storage form of the second logical unit as the second storage form, where the first logical unit is mapped to a common system disk, the second logical unit is mapped to a fast system disk, and files in the common system disk and the fast system disk are mounted on the same directory of the file system.

According to a third aspect, an electronic device is provided, and includes one or more processors, a universal flash storage UFS, one or more memories, a plurality of applications, and one or more programs. The one or more programs are stored in the memory, and when the one or more programs are executed by the processor, the electronic device is enabled to perform the method according to any one of the first aspect or the implementations of the first aspect.

According to a fourth aspect, an apparatus is provided. The apparatus is included in an electronic device, and the apparatus has functions of implementing behavior of the electronic device in the foregoing aspects and the possible implementations of the foregoing aspects. The functions may be implemented by hardware, or may be implemented by hardware executing corresponding software. The hardware or the software includes one or more modules or units corresponding to the foregoing functions, for example, a display module or unit, a detection module or unit, or a processing module or unit.

According to a fifth aspect, a storage system is provided. The storage system includes a universal flash storage UFS, a processor, and an interface. The processor and the interface cooperate with each other, so that the storage system performs the method according to any one of the first aspect or the implementations of the first aspect.

According to a sixth aspect, this application provides an electronic device, including a touch display. The touch display includes a touch-sensitive surface, a display, a camera, one or more processors, a memory, a plurality of applications, and one or more computer programs. The one or more computer programs are stored in the memory, and the one or more computer programs include instructions. When the instructions are executed by the electronic device, the electronic device is enabled to perform any possible method according to any one of the foregoing aspects.

According to a seventh aspect, this application provides an electronic device, including one or more processors and one or more memories. The one or more memories are coupled to the one or more processors. The one or more memories are configured to store computer program code. The computer program code includes computer instructions. When the one or more processors execute the computer instructions, the electronic device is enabled to perform the method according to any one of the first aspect or the implementations of the first aspect.

According to an eighth aspect, this application provides a computer storage medium, including computer instructions. When the computer instructions are run on an electronic device, the electronic device is enabled to perform the method according to any one of the first aspect or the implementations of the first aspect.

According to a ninth aspect, this application provides a computer program product. When the computer program product runs on an electronic device, the electronic device is enabled to perform the method according to any one of the first aspect or the implementations of the first aspect.

DETAILED DESCRIPTION OF ILLUSTRATIVE EMBODIMENTS

The following describes the technical solutions in embodiments of this application with reference to the accompanying drawings in embodiments of this application. In descriptions in embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions in embodiments of this application, "a plurality of" means two or more.

The terms "first" and "second" mentioned below are merely intended for the purpose of description, and shall not be understood as an indication or implication of relative importance or implicit indication of a quantity of indicated technical features. Therefore, a feature restricted by "first" or "second" may explicitly or implicitly include one or more such features.

Figure 1:
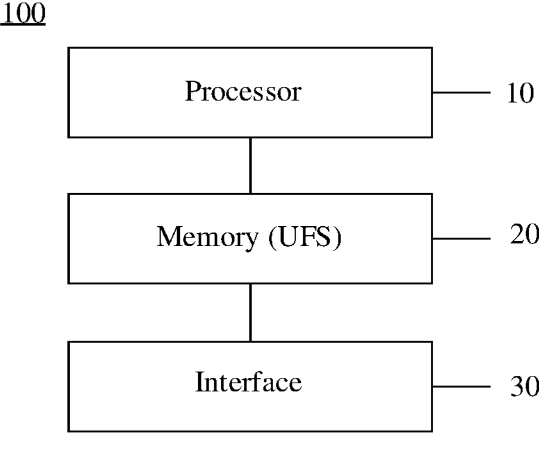
FIG. 1 is a schematic diagram of a structure of an example of a storage system according to an embodiment of this application.

FIG. 1 is a schematic diagram of a structure of an example of a storage system 100 according to an embodiment of this application. For example, the storage system 100 may include a processor 10, a memory 20, and an interface 30.

The processor 10 may include one or more processing units. For example, the processor 10 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent devices, or may be integrated into one or more processors. The controller may be a nerve center and a command center of the storage system 100. The controller may generate an operation control signal based on an instruction operation code and a time sequence signal, to complete control of instruction reading and instruction execution.

The memory 20 is configured to store instructions and data. The memory 20 may include an internal memory and an external memory that are disposed in the processor 10. The external memory may be connected to the processor 10. In some embodiments, the internal memory in the processor 10 may be a cache memory. The memory may store instructions or data just used or cyclically used by the processor 10. If the processor 10 needs to use the instructions or the data again, the processor 10 may directly invoke the instructions or the data from the memory. This avoids repeated access and reduces waiting time of the processor 10, to improve system efficiency.

In this embodiment of this application, the storage system 100 may implement a file storage and reading process based on a UFS. Therefore, for example, the storage system 100 includes a single UFS, and a hybrid medium multi-disk storage system is established based on the UFS. It should be understood that the memory 20 includes but is not limited to a UFS, or may be a memory of another type. This is not limited in this embodiment of this application.

It should be further understood that the storage system 100 may further include more storage devices or storage devices of other types, for example, an eMMC. This is not limited in this embodiment of this application.

The interface 30 may be one or more interfaces of different types, may include an internal interface or an external interface, and is configured to connect to modules in the storage system. For example, the interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identification module (subscriber identification module, SIM) interface, and/or a universal serial bus (universal serial bus, USB) port. It should be understood that the storage system 100 may alternatively use different interface connection manners, or a combination of a plurality of interface connection manners. An interface type and an interface connection manner are not limited in this embodiment of this application.

It may be understood that the structure shown in this embodiment of this application does not constitute a specific limitation on the storage system 100. In some other embodiments of this application, the storage system 100 may include more or fewer components than those shown in the figure, or combine some components, or split some components, or have different component arrangements. The components shown in the figure may be implemented by hardware, software, or a combination of software and hardware.

The storage system 100 provided in this embodiment of this application may be applied to a terminal device with a built-in UFS. The terminal device may be a device with a UFS, such as a mobile phone, a tablet computer, a PC, a wearable device, a vehicle-mounted device, an augmented reality (augmented reality, AR) device/a virtual reality (virtual reality, VR) device, an ultra-mobile personal computer (ultra-mobile personal computer, UMPC), a netbook, or a personal digital assistant (personal digital assistant, PDA). A specific type of the terminal device is not limited in embodiments of this application.

It should be understood that the terminal device listed in this embodiment of this application may further include more other components in addition to the foregoing storage system 100. For example, the terminal device may further include one or more of a charging management module, a power management module, a battery, an antenna, a mobile communications module, a wireless communications module, an audio module, a speaker, a receiver, a microphone, a headset jack, a sensor module, a button, a motor, an indicator, a camera, a display, a subscriber identification module (subscriber identification module, SIM) card interface, or the like. The sensor module may include a pressure sensor, a gyro sensor, a barometric pressure sensor, a magnetic sensor, an acceleration sensor, a distance sensor, an optical proximity sensor, a fingerprint sensor, a temperature sensor, a touch sensor, an ambient light sensor, a bone conduction sensor, and the like. A quantity of components included in the terminal device and a type of a component are not limited in this embodiment of this application.

Figure 2:
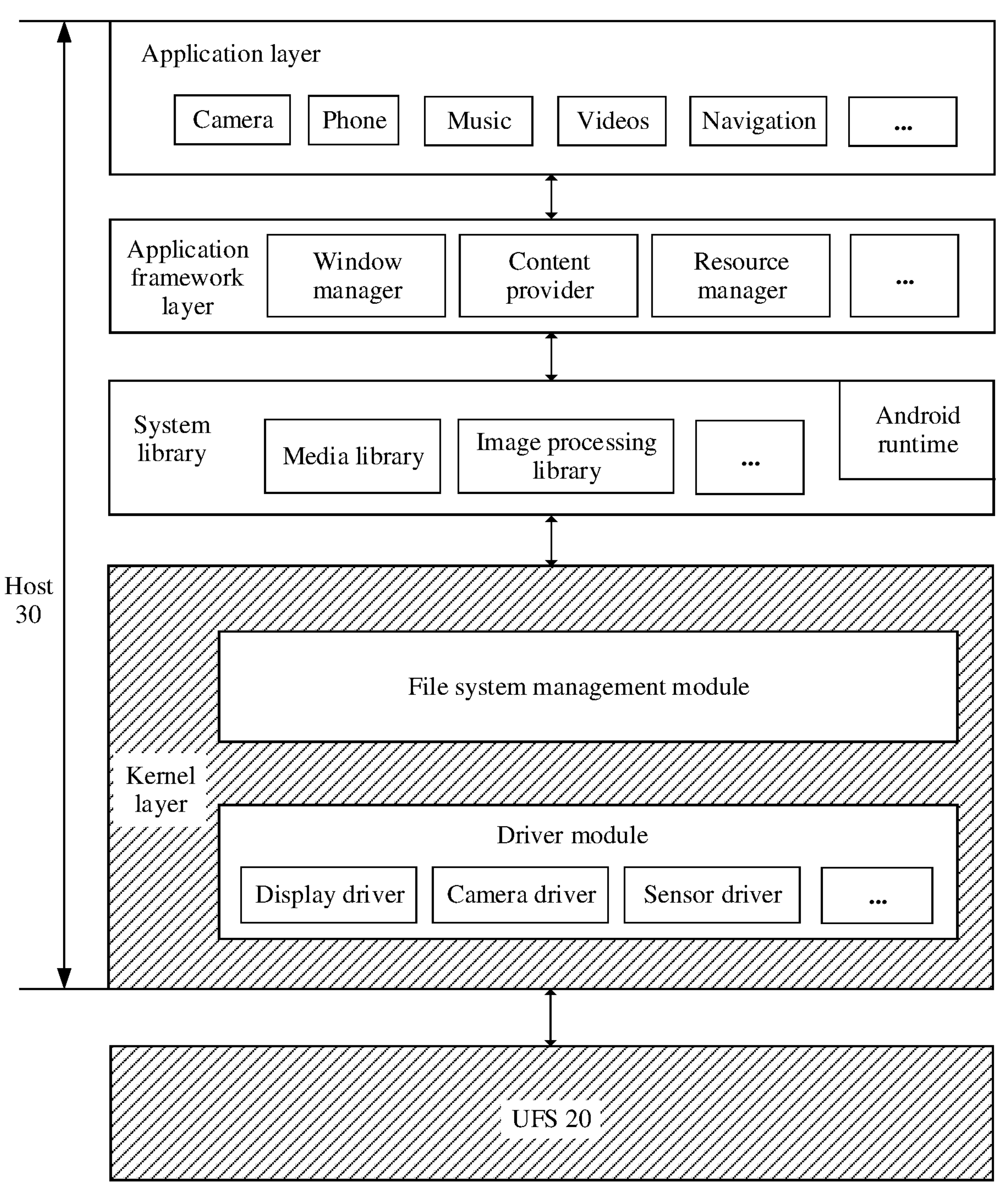
FIG. 2 is a block diagram of a software structure of a storage system according to an embodiment of this application.

FIG. 2 is a block diagram of a software structure of a storage system 100 according to an embodiment of this application. It should be understood that FIG. 2 may correspond to the structure of the storage system 100 in FIG. 1, and the storage system 100 is divided into a device side and a host 30. The device side may correspond to the memory in the storage system 100, for example, a UFS 20. The host 30 may correspond to the processor 10 and a software architecture provided by the processor 10. A software architecture of the host 30 may use a layered architecture. In this embodiment of this application, an Android system with the layered architecture is used as an example to describe the software structure of the storage system 100.

In the layered architecture, software is divided into several layers, and each layer has a clear role and task. The layers communicate with each other through a software interface. In some embodiments, the Android system is divided into four layers: an application layer, an application framework layer, an Android runtime (Android runtime) and system library, and a kernel layer from top to bottom.

The application layer may include a series of application packages. As shown in FIG. 2, the application packages may include applications such as Camera, Phone, Music, Videos, and Navigation.

The application framework layer provides an application programming interface (application programming interface, API) and a programming framework for an application at the application layer. The application framework layer includes some predefined functions. As shown in FIG. 2, the application framework layer may include a window manager, a content provider, a resource manager, and the like.

The window manager is configured to manage a window program. The window manager may obtain a size of a display, determine whether there is a status bar, perform screen locking, take a screenshot, and the like. The content provider is configured to: store and obtain data, and enable the data to be accessed by an application. The data may include a video, an image, an audio, calls that are made and answered, a browsing history and bookmarks, an address book, and the like. The resource manager provides various resources such as a localized character string, an icon, a picture, a layout file, and a video file for an application.

The Android runtime includes a core library and a virtual machine. The Android runtime is responsible for scheduling and management of the Android system. The core library includes two parts: a function that needs to be invoked in Java language and a core library of Android. The application layer and the application framework layer run on the virtual machine. The virtual machine executes Java files at the application layer and the application framework layer as binary files. The virtual machine is configured to implement functions such as object lifecycle management, stack management, thread management, security and exception management, and garbage collection.

The system library may include a plurality of functional modules, for example, a media library (media library) and an image processing library. The media library supports playback and recording in a plurality of commonly used audio and video formats, static image files, and the like. The media library may support a plurality of audio and video coding formats, for example, MPEG-4, H.264, MP3, AAC, AMR, JPG, and PNG. The image processing library is configured to implement graphics drawing, image rendering, composition, layer processing, and the like.

The kernel layer is a layer between hardware and software. The kernel layer includes at least a driver module, a file system management module, and the like. The driver module may include a display driver, a camera driver, a sensor driver, and the like. The file system is configured to manage user data or files.

For ease of understanding, a storage system having the structures shown in FIG. 1 and FIG. 2 is used as an example in the following embodiments of this application, and it is assumed that a size of a UFS 20 built in the storage system 100 is 256 gigabytes (gigabyte, GB). The storage system, a data storage method based on the storage system, and a data reading method based on the storage system provided in embodiments of this application are specifically described.

Figure 3:
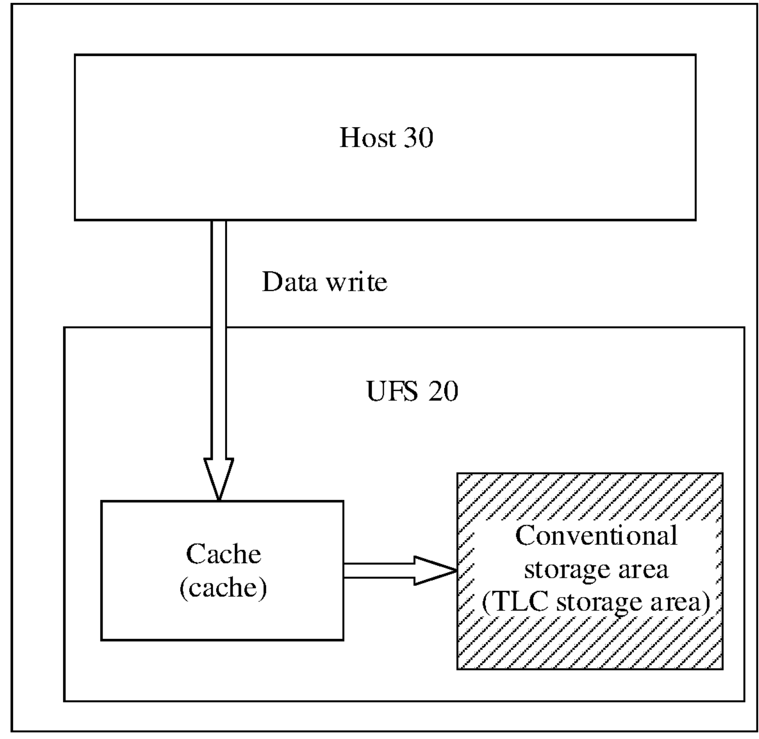
FIG. 3 is a schematic diagram of configuring a UFS in an example of a storage system.

FIG. 3 is a schematic diagram of configuring a UFS in an example of a storage system. As shown in FIG. 3, in an existing storage system including a UFS 20, the UFS 20 may be divided into a cache (cache) and a conventional storage area. The cache and the conventional storage area have different data storage forms. The cache (cache) is usually encapsulated into a data storage form of a single-level cell (single-level cell, SLC) mode, and each storage unit encapsulated into the SLC storage form may store 1-bit (bit) data. Therefore, the cache may also be referred to as a "high-speed cache (cache)". A cache encapsulated into an SLC storage form is usually used only for data caching, and corresponds to the cache (cache) in FIG. 3. The area has high data storage performance and high data read performance, but cannot implement persistent data storage.

The conventional storage area is usually encapsulated into a storage form of a triple-level cell (triple-level cell, TLC) mode, and each storage unit encapsulated into the TLC storage form may store 3-bit (bit) data. Therefore, the conventional storage area may also be referred to as a "TLC storage area". For example, a 256 GB UFS is used as an example. Before delivery, the UFS may include a cache (cache) of approximately 4 GB and a conventional storage area of 256 GB. The cache is encapsulated into an SLC storage form, and the conventional storage area is encapsulated into a TLC storage form.

It should be understood that the 4 GB cache is usually an attached cache area other than the 256 GB persistent storage area when the UFS is delivered from a factory. Therefore, the UFS may actually include the 256 GB storage area and the 4 GB cache area.

It should be understood that, at same medium costs, a capacity of the TLC storage area is three times that of the SLC storage area, but a service life and performance of the SLC storage area are far higher than those of the TLC storage area. For a storage device and a terminal device, in consideration of a capacity specification and performance of the storage system, as shown in FIG. 3, the existing storage system including the UFS is encapsulated into the cache (cache) and the conventional storage area (TLC storage area). This may be understood as a hybrid medium storage form including a small quantity of SLC storage forms and TLC storage forms, to obtain large storage space and improve performance of the storage system. The cache encapsulated into the SLC storage form is very small, for example, 4 GB, is usually used only for data caching (caching), and cannot implement persistent data storage. The storage area encapsulated into the TLC storage form is used for persistent storage, has a large capacity, for example, 256 GB, and corresponds to the conventional storage area (or referred to as the "TLC storage area") shown in a shaded part in FIG. 3.

In a data writing process shown by an arrow direction in FIG. 3, when writing data to the UFS 20, the host 30 needs to first write the data to the cache for caching, and then writes the data to the conventional storage area (TLC storage area) through the cache for persistent storage. Correspondingly, when reading data from the UFS 20, the host 30 may directly read the data from the cache, or may directly read the data from the conventional storage area. In other words, in a data writing process, the data needs to be cached through the cache, and in a data reading process, the host 30 may directly obtain the data from the cache or the conventional storage area (TLC storage area).

It should be understood that the cache (cache) has a very small capacity. When the cache is used to some extent, the data is extruded from the cache (cache). If the extruded data is read next time, the data is still obtained from the TLC storage area. Reading the data from the cache improves data read performance only when the data is stored in the cache (cache). If the data is obtained from the TLC storage area (conventional storage area), read/write performance is not improved. When the data is written for the first time, the data is stored in the TLC storage area. The data reading process still reflects performance of the conventional TLC storage area, and performance is not improved. In addition, the cache has a limited capacity. If all data is read from the cache, an excessive quantity of read/write times leads to an excessive quantity of erase times. As the user uses the cache for a long time, a service life is shortened faster and the cache cannot be used for a long time.

This application provides a UFS-based storage system, and provides a storage method, to implement a storage effect of a hybrid medium when storage space and read/write performance of the storage system are considered.

Figure 4:
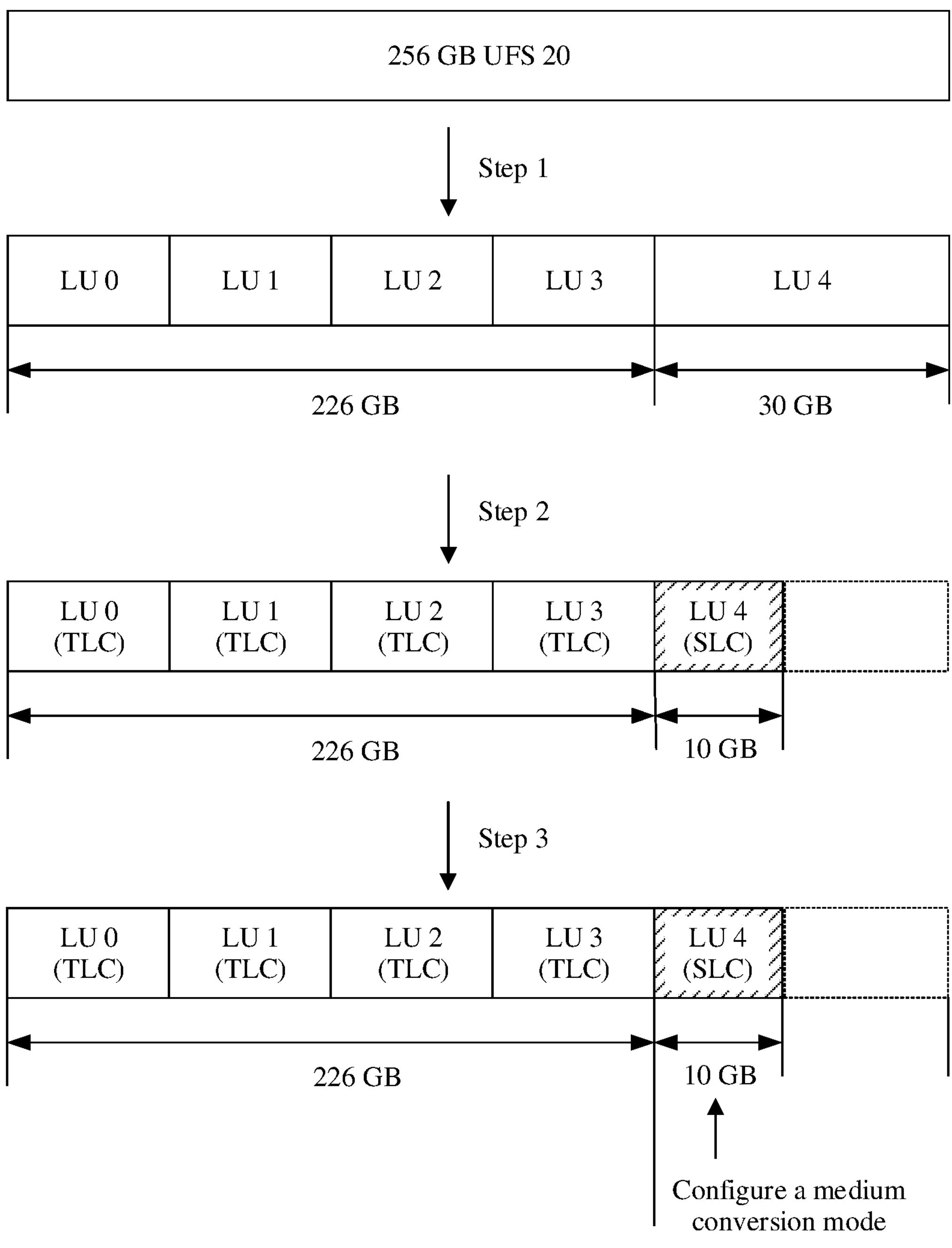
FIG. 4 is a schematic diagram of an example of UFS configuration according to an embodiment of this application.

FIG. 4 is a schematic diagram of an example of UFS configuration according to an embodiment of this application. In this application, for example, a 256 GB UFS 20 is built in a storage system 100. In this embodiment of this application, initialization configuration is performed on the UFS 20 according to the method shown in FIG. 4. It should be understood that the initialization configuration process may be performed by a processor 10 or a host 30 in the storage system 100.

Optionally, the processor 10 or the host 30 may send an instruction to the UFS 20, and a controller in the UFS performs a configuration process according to the instruction. A specific configuration process includes the following steps.

Step 1: Configure a quantity of logical units and a size of a logical unit in the UFS 20.

Specifically, in an initialization process of the UFS 20, the 256 GB UFS 20 is first configured as (N+M) logical units (logical unit, LU), where N is greater than or equal to 1, M is greater than or equal to 1, and N and M are integers. N and M are used to distinguish between different storage forms. For example, the (N+M) LUs include at least two different storage forms.

In a possible implementation, a data storage form of a first logical unit in the UFS is configured as a first storage form and a data storage form of a second logical unit in the UFS is configured as a second storage form, where the first logical unit and the second logical unit are mounted on a same directory of a file system, the first storage form is different from the second storage form, and read/write performance of the second storage form is higher than read/write performance of the first storage form.

In this embodiment of this application, an example in which the (N+M) LUs include two different storage forms is used for description. The (N+M) LUs include N first logical units and M second logical units. The N first logical units each are configured in the first storage form, the M second logical units each are configured in the second storage form, and the first logical unit and the second logical unit are mounted on the same directory of the file system.

It should be understood that a size of storage space of each of the (N+M) LUs is not limited in this embodiment of this application.

In descriptions of the following embodiments, an example in which N is 4 and M is 1 is used for description. The 256 GB UFS 20 is configured to include (4+1) LUs. Four first logical units each are configured in the first storage form, and one second logical unit is configured in the second storage form. The four first logical units are respectively denoted as an LU 0, an LU 1, an LU 2, and an LU 3, and the one second logical unit is denoted as an LU 4. Storage space of the LU 0, the LU 1, the LU 2, the LU 3, and the LU 4 may be the same or different. This is not limited in this embodiment of this application.

In a possible implementation, in a process of configuring the (4+1) LUs in this embodiment of this application, each of the LU 0 and the LU 1 is configured as 4 megabytes (MByte, MB), the LU 2 is configured as 8 MB, and the LU 3 is configured as 1008 MB+225 GB, that is, total storage space of the four LUs (the LU 0 to the LU 3) is configured as 226 GB, and a fifth LU (the LU 4) is configured as 30 GB. The LU 3 and the LU 4 are storage areas that can be used by a user.

Therefore, after the configuration process described above, a 256 GB logical unit domain of the UFS is configured to include four storage areas in the first storage form and one storage area in the second storage form.

Step 2: Configure a storage form of the logical unit in the UFS 20.

In a possible implementation, the second logical unit is configured as a particle medium having higher read/write performance than the first logical unit. In other words, the second logical unit in the second storage form has higher read/write performance than the first logical unit in the first storage form.

Optionally, the first storage form includes a triple-level cell TLC, and the second storage form includes a single-level cell SLC; or the first storage form includes a multi-level cell MLC, and the second storage form includes an SLC; or the first storage form includes a QLC, and the second storage form includes an SLC; or the first storage form includes a TLC, and the second storage form includes an MLC; or the first storage form includes a QLC, and the second storage form includes an MLC; or the first storage form includes a QLC, and the second storage form includes a TLC.

It should be understood that the single-level cell SLC, the multi-level cell (multi-level cell, MLC), the triple-level cell TLC, and the quad-level cell (quad-level cell, QLC) are in ascending order of capacities, but are in descending order of performance and service lives.

For example, in this embodiment of this application, as shown in FIG. 4, after step 1, the 256 GB UFS 20 is configured as (4+1) LUs of different sizes, and then storage forms of the LUs are configured in step 2. For example, the first four LUs (an LU 0, an LU 1, an LU 2, and an LU 3) each are configured in a TLC storage form, and a fifth LU (an LU 4) is configured in an SLC storage form. In other words, the UFS 20 is configured to include four TLC storage areas and one SLC storage area.

It should be understood that, at same medium costs, a capacity of the TLC storage area is three times that of the SLC storage area. Therefore, when a 30 GB LU 4 is configured in the SLC storage form, actual storage space of the LU 4 is 10 GB. As shown in FIG. 4, after step 2, the 30 GB LU 4 is presented as a 10 GB SLC storage area.

It should be further understood that, in this embodiment of this application, the configured SLC storage area is a persistent storage area. The SLC storage area is equivalent to a part of fixed storage obtained by dividing an original conventional storage area (TLC storage area), and is a part of storage of a terminal device. Data stored in the SLC storage area continues to be retained after a power failure. Therefore, the SLC storage area is different from the cache (cache) described in FIG. 3 in which the cache in FIG. 3 may store a daily running program, data, and the like, and the program and data in the cache may be cleared after a power failure. In descriptions of this embodiment of this application, the original cache of the storage system is not described in detail.

It should be further understood that, compared with an existing cache, the SLC storage area is in an SLC storage form, and has same read/write performance in all aspects. However, the SLC storage area may be applied to all user scenarios in which data is read/written. For example, the data may be directly written to the SLC storage area, and does not need to be written to the TLC storage area through the cache. This simplifies a data write procedure and improves data read/write performance. In addition, a service life of the SLC storage area is far longer than that of the TLC storage area, so that a service life of the storage system can be prolonged.

Compared with configuring all storage areas in a TLC storage form, configuring storage space of the UFS to include a storage area in an SLC storage form and a storage area in a TLC storage form can improve performance of the storage system and prolong a service life of the storage system. For example, after detection, if the UFS is configured to include the storage area in the SLC storage form and the storage area in the TLC storage form, in a data reading process, read performance of the UFS can be improved by 50% in terms of a component of the storage system or in terms of working efficiency of a kernel layer; and in terms of use by a user, overall user file read performance can be improved by 20% to 30% in a process of using an application by the user.

Step 3: Configure a storage form conversion mode of the logical unit in the UFS 20.

Specifically, the four TLC storage areas included in the UFS 20 are conventional storage areas, and are used for persistent storage. Therefore, the LU 0, the LU 1, the LU 2, and the LU 3 each are fixedly configured in a TLC storage form. One SLC storage area may be configured in different storage forms, so that the LU 4 is configured in a corresponding storage form conversion mode in a future use process based on different scenarios and requirements. For example, the LU 4 may implement conversion between an SLC storage form and a TLC storage form, to meet different user requirements.

(1) Storage Form Conversion Mode 1

In a possible implementation, a storage form conversion mode of the LU 4 is configured as a unidirectional return mode. Specifically, the LU 4 may be unidirectionally converted from a second storage form to a first storage form.

It should be understood that the "unidirectional return mode" herein may mean that the LU 4 is configured in the SLC storage form, and when a preset condition is met, the LU 4 may be converted from the SLC storage form to the TLC storage form. This process is referred to as the "unidirectional return mode" because this process is an irreversible process.

Optionally, the preset condition may include at least one of the following: Data stored in the SLC storage area represented by the LU 4 is greater than or equal to a preset threshold (for example, 10 GB); or remaining storage space of the SLC storage area represented by the LU 4 is less than a preset threshold; or a service life of the SLC storage area represented by the LU 4 reaches a preset value. Optionally, statistics about the service life of the SLC storage area may be collected based on a quantity of program-erase (program-erase, PE) times of the SLC storage area, and the preset value is that the quantity of PE times reaches 1000. When at least one of the foregoing preset conditions is met, the LU 4 may be converted from the SLC storage form to the TLC storage form.

Figure 5:
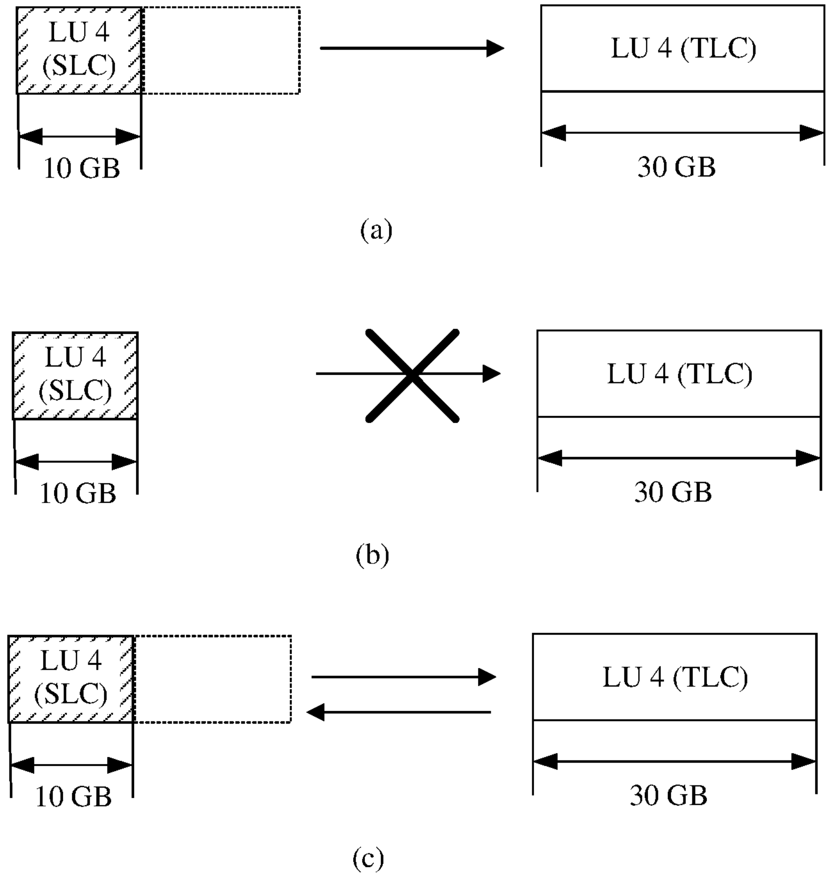
FIG. 5 is a schematic diagram of an example of a storage form conversion mode according to an embodiment of this application.

For example, FIG. 5 is a schematic diagram of an example of a storage form conversion mode according to an embodiment of this application. The unidirectional return mode may be shown in (a) in FIG. 5. When the preset condition is met, the LU 4 may be converted from a 10 GB SLC storage area to a 30 GB TLC storage area.

It should be understood that, after the LU 4 is converted from the SLC storage form to the TLC storage form, storage space of the LU 4 is restored to 30 GB. This configuration manner may expand actual storage space of the storage system. For example, when data stored in the LU 4 exceeds 10 GB, storage space of the LU 4 cannot meet a current user requirement. In this case, the LU 4 is converted from the SLC storage form to the TLC storage form, that is, 10 GB storage space is expanded to 30 GB storage space, so that current data storage pressure can be relieved. In addition, a conversion process of the storage form affects neither a format nor a size of original data stored in the SLC storage area.

In addition, the storage form conversion mode of the LU 4 is configured as the unidirectional return mode. For a user, available actual storage space of the UFS 20 is not lost, and is still 256 GB. This ensures use efficiency of the actual storage space of the UFS without user perception.

It should be further understood that, after the LU 4 is converted from the SLC storage form to the TLC storage form, that is, the LU 4 is converted from the SLC storage area to the TLC storage area, and is permanently embodied as the TLC storage area, the LU 0, the LU 1, the LU 2, the LU 3, and the LU 4 are all TLC storage areas.

(2) Storage Form Conversion Mode 2

In a possible implementation, a storage form conversion mode of the LU 4 is configured as a non-return mode.

It should be understood that the "non-return mode" herein may mean that the LU 4 is configured in the SLC storage form, and permanently remains in the SLC storage form. This process is referred to as the "non-return mode" because this process is a process in which the storage form does not change.

Specifically, as shown in (b) in FIG. 5, a storage form conversion mode corresponding to the SLC storage area in a use process may be configured as the "non-return mode", that is, the SLC storage area cannot be converted from the SLC storage form to the TLC storage form. In addition, an upper limit of a quantity of program-erase times of the SLC storage area is not set, that is, a service life of the SLC storage area is not set. Therefore, the storage form of the SLC storage area is never changed, and the service life of the SLC storage area is far longer than that of the TLC storage area. The user can always use the SLC storage area to store data, and experience storage space in a high-performance storage form, to improve data read/write performance.

It should be understood that, in the conversion mode, storage space and visible capacity specifications of the SLC storage area actually accessed by the user each are 10 GB, and finally, actual storage space of the UFS 20 changes to 236 GB.

(3) Storage Form Conversion Mode 3

In a possible implementation, a storage form conversion mode of the LU 4 is configured as a bidirectional return mode.

It should be understood that the "bidirectional return mode" herein may mean that the LU 4 may be configured in either of the SLC storage form and the TLC storage form, and may be converted between the SLC storage form and the TLC storage form.

Specifically, as shown in (c) in FIG. 5, a storage form conversion mode corresponding to the SLC storage area in a use process may be configured as the "bidirectional return mode", that is, the LU 4 may be converted from the SLC storage form to the TLC storage form, and may be further converted from the TLC storage form to the SLC storage form.

Optionally, when storage space of the LU 4 is less than a preset threshold, the LU 4 may be converted from the second storage form to the first storage form, and when the storage space of the LU 4 is greater than or equal to the preset threshold, the LU 4 may also be converted from the first storage form to the second storage form. This is not limited in this embodiment of this application.

Optionally, when a quantity of program-erase times of the LU 4 is within a preset value (for example, 1000), based on a user requirement on a capacity specification of the storage system, the LU 4 may be converted from the SLC storage form to the TLC storage form, and may also be converted from the TLC storage form to the SLC storage form. For example, when data that currently needs to be stored by the user in the LU 4 is greater than 10 GB, the LU 4 is converted from the SLC storage form to the TLC storage form; or when data that currently needs to be stored by the user in the LU 4 is less than or equal to 10 GB, the LU 4 is converted from the TLC storage form to the SLC storage form.

It should be understood that, when the capacity of the storage system is sufficient, the LU 4 is in the SLC storage form, and is in a high-performance mode, so that better read/write experience can be achieved. When the capacity of the storage system is insufficient, the LU 4 is in the TLC storage form, increases an available storage capacity, and is in a high-capacity mode. In this case, larger storage space can be achieved.

According to the foregoing solution, the storage form of the LU 4 can be flexibly adjusted based on a current user requirement on a capacity and performance of the storage system, to implement balanced utilization of the performance and the capacity. Compared with the storage form conversion mode 1 of the unidirectional return mode, in this method, a case in which the storage system is in a single TLC storage form and better storage performance experience cannot be achieved can be avoided. Compared with the storage form conversion mode 2 of the non-return mode, in this method, the storage space can be expanded when the storage space is limited, and a case in which when the storage capacity of the LU 4 reaches a peak (for example, 10 GB), the LU 4 is converted from the SLC storage form to the TLC storage form, but the LU 4 cannot return to a high-performance state in the SLC storage form can be avoided, to improve performance of the storage system. In addition, the storage form conversion mode of the LU 4 is configured as the bidirectional return mode. For a user, available actual storage space of the UFS 20 is not lost, and is still 256 GB. This ensures use efficiency of the actual storage space of the UFS without user perception.

It should be understood that step 1 to step 3 are a process in which the UFS 20 receives the instruction from the processor 10, and the controller in the UFS completes initialization configuration on the UFS 20. After the initial configuration on the UFS 20 is completed, the (4+1) LUs configured by the UFS 20 are mapped to the host 30 according to the instruction of the processor 10, to form logical storage devices on the side of the host 30. The logical storage devices may be understood as different storage areas or storage spaces on the side of the host 30. The logical storage devices on the side of the host 30 are in a one-to-one correspondence with the LUs in the UFS 20.

Step 4: Map the logical unit in the UFS 20.

Specifically, the LU 0, the LU 1, the LU 2, the LU 3, and the LU 4 that are configured by the UFS 20 are mapped to the host 30, to form logical storage devices on the host 30, and respectively correspond to independent storage areas on the side of the host 30.

For example, the LU 0 corresponds to a storage area sda of the host 30, the LU 1 corresponds to a storage area sdb of the host 30, the LU 2 corresponds to a storage area sdc of the host 30, the LU 3 corresponds to a storage area sdd of the host 30, and the LU 4 corresponds to a storage area sde of the host 30. An independent storage area corresponding to the side of the host 30 may be referred to as a "disk". For example, in the UFS 20, the LU 0, the LU 1, the LU 2, and the LU 3 are mapped to common disks on the host 30, and the LU 4 is mapped to a high-speed disk on the host 30. In this case, sda, sdb, sdc, and sdd are the common disks, and sde is the high-speed disk.

It should be understood that, although the LU 4 and the LU 3 in this embodiment of this application are mapped to different disks, for a file system of a device, a file in a high-speed disk to which the LU 4 is mapped and a file in a common disk to which the LU 3 is mapped are mounted on a same directory of the file system.

In a working process of the storage system, the host 30 is in a running state. When a file is written to the storage area sdd on the side of the host 30, it means that the file is actually stored in the LU 3 in the UFS 20, that is, the file is stored in a conventional storage area (TLC storage area) shown in FIG. 6. When a file is written to the storage area sde on the side of the host 30, it means that the file is actually stored in the LU 4 in the UFS 20, that is, the file is stored in a high-speed storage area (SLC storage area) shown in FIG. 6.

In this embodiment of this application, based on the storage system with the built-in UFS, in the process of step 1 to step 4, the UFS is configured to include a plurality of storage areas in different storage forms. Data read/write performance of the storage areas in the different storage forms is different, so that the storage system includes a hybrid storage medium, to meet user requirements on a capacity and performance of the storage system.

Figure 6:
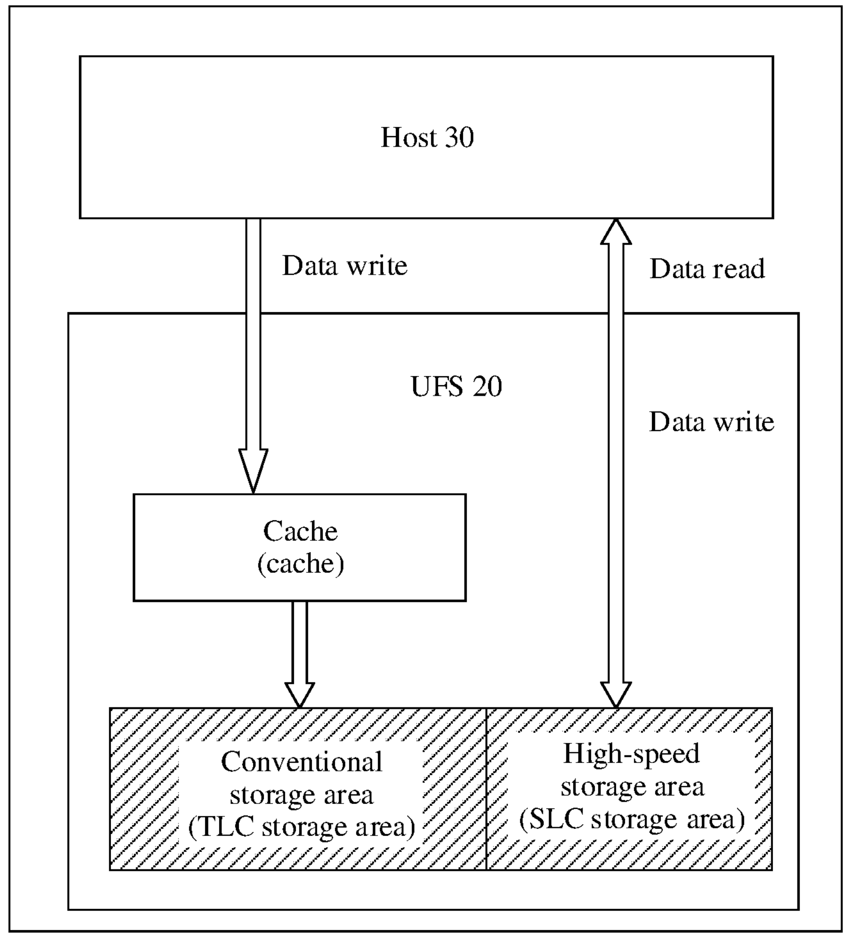
FIG. 6 is a schematic diagram of a data read/write process of an example of a storage system according to an embodiment of this application.

For example, FIG. 6 is a schematic diagram of a data read/write process of an example of a storage system according to an embodiment of this application. As shown in FIG. 6, a storage area of the UFS 20 is configured to include a conventional storage area in a TLC storage form, a cache (cache) in an SLC storage form, and a high-speed storage area in an SLC storage form.

It should be understood that the high-speed storage area (SLC storage area) in the SLC storage form can improve read/write performance and a service life of the storage system, and the conventional storage area (TLC storage area) in the TLC storage form can ensure a capacity specification of the storage system, to balance user requirements on a capacity and performance of the storage system. It should be further understood that data in this embodiment of this application may be a related file or the like of an application.

It should be further understood that the conventional storage area and the high-speed storage area in FIG. 6 may alternatively be independent storage areas, and storage forms of the conventional storage area and the high-speed storage area may not be converted. In other words, the file creation method provided in this embodiment of this application may be further applied to a storage system that includes an independent conventional storage area and an independent high-speed storage area. This is not limited in this embodiment of this application.

As shown in FIG. 6, a downward arrow may represent a process in which the host 30 writes data to the UFS 20, and an upward arrow represents a process in which the host 30 reads data from the UFS 20. Specifically, in a data writing process, the host 30 may write data to a cache (cache), or write data to a conventional storage area (TLC storage area) through the cache (cache), or may directly write data to a high-speed storage area (SLC storage area) in an SLC storage form. The conventional storage area (TLC storage area) and the high-speed storage area (SLC storage area) may be used for persistent storage, and the cache (cache) is used only for data caching according to an existing solution.

In a data reading process, the host 30 may read data from the cache (cache), or directly read data from the conventional storage area (TLC storage area), or may directly read data from the high-speed storage area (SLC storage area).

In conclusion, in this embodiment of this application, the high-speed storage area in the SLC storage form is configured, so that the host 30 can directly write the data to the high-speed storage area (SLC storage area), and can read the data from the high-speed storage area. This avoids a case in which the data can be written to the conventional storage area only through the cache (cache) for persistent storage. Because performance and a service life of an SLC medium are far higher than those of a TLC medium, the storage system provided in embodiments of this application can improve data read/write performance, and can prolong a service life of the storage system.

In addition, in this embodiment of this application, a conversion mode of a storage form of the high-speed storage area (SLC storage area) may be further configured. For example, the high-speed storage area may be configured in a unidirectional return mode in which the high-speed storage area is converted from an SLC storage form to a TLC storage form in a specific condition, to meet a user requirement on a capacity of the storage system. Alternatively, the high-speed storage area may be configured in a non-return mode of a permanent SLC storage form, to meet a user requirement on read/write performance of the storage system. Alternatively, the high-speed storage area may be configured in a bidirectional return mode of an SLC storage form and a TLC storage form, and may be converted from the SLC storage form to the TLC storage form, and may be further converted from the TLC storage form to the SLC storage form. When the user has a higher requirement on a capacity of the storage system, the high-speed storage area (SLC storage area) in the SLC storage form may be converted into the conventional storage area (TLC storage area) in the TLC storage form, to expand the capacity of the storage system. When the user has a higher requirement on performance of the storage system, the high-speed storage area remains in the SLC storage form, to improve data read/write performance of the storage system. Conversion modes of a plurality of storage forms can be used in a plurality of different user scenarios to improve user experience without user perception.

Figure 7:
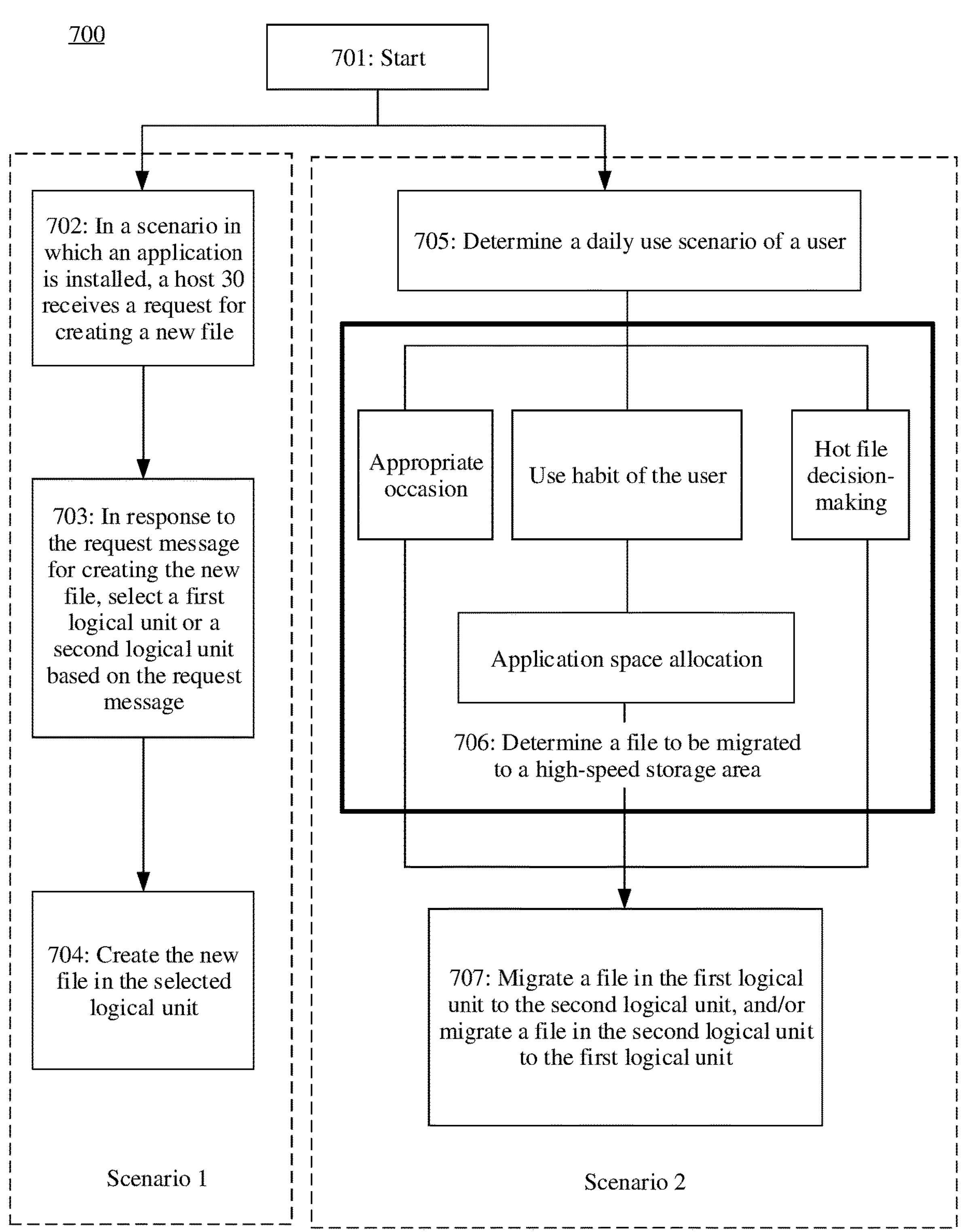
FIG. 7 is a schematic diagram of an example of a file creation process according to an embodiment of this application.

According to the storage system described above, in a working process of the storage system, the host 30 may write data to the UFS 20. FIG. 7 is a schematic diagram of an example of a file creation process according to an embodiment of this application. In different use scenarios of a mobile phone, types of to-be-written data are different. As shown in FIG. 7, in the method 700, for different application scenarios, it is determined that different data or files are written to a high-speed storage area.

Scenario 1

For example, when a user installs an application (application, APP) on a mobile phone, a method in step 701 to step 704 may be performed.

701: Start.

702: In a scenario in which an application is installed, a host 30 receives a request for creating a new file.

When installing an APP, the user needs to create a file of the APP into a storage area of a storage system. Specifically, when the APP is installed, a to-be-created new file includes various different binary files used when the APP is installed, and the different binary files have different names and file types.

It should be understood that the new file herein may be various files obtained when an application installation package downloaded from an application store is decompressed, compiled, and the like.

Optionally, the request message for creating the new file may include machine learning data or information about a preset data table. The host 30 may obtain the machine learning data or the information about the preset data table based on the received request message. The machine learning data or the information about the preset data table may list a plurality of hot applications or hot files of an application, so that the host 30 can determine whether an application currently to be installed by the user is a hot application or which files in the application are hot files.

The host 30 may further create different files into different storage areas, for example, the cache (cache) shown in FIG. 6, or write data to a conventional storage area (TLC storage area) through the cache (cache), or may directly write data to a high-speed storage area (SLC storage area) in an SLC storage form. In the scenario in which the application is installed on the mobile phone, persistent storage needs to be performed on a to-be-created new file, that is, the to-be-created new file is written to the conventional storage area (TLC storage area) or the high-speed storage area (SLC storage area).

703: In response to the request message for creating the new file, the host 30 selects a first logical unit or a second logical unit based on the request message.

704: The host 30 creates the new file in the selected logical unit.

In a possible implementation, the host 30 may select the first logical unit or the second logical unit based on a file type of the to-be-created new file.

Optionally, the host 30 may be based on the request message for creating the new file, where the request message for creating the new file may further include file type information of the new file. The host 30 may choose, based on the machine learning data or the information about the preset data table and the file type information of the new file, to create the new file into the first logical unit or the second logical unit.

For example, common file types in the mobile phone may be listed in Table 1. Table 1 lists some possible file formats and corresponding file types. For example, in the request message, an application compressed package file is preset as a hot file. After receiving the file creation request, the host 30 creates the .apk file into the second logical unit, that is, the high-speed storage area. This is not limited in this embodiment of this application.

TABLE 1

| File format | File type |
|---|---|
| .apk | Application compressed package |
| .so | Library file |
| .odex/.vdex | Optimized compilation binary file |
| .db/.db-journal/.db-wal | Database file |
| .xml | Configuration information |
| .mp4 | Video media file |
| .jpg/.png | Image media file |
| .m4a/.mp3/.flac | Audio media file |
| .amr | Audio file (a call record, recording, or the like) |
| enc | Encrypted file (personal data, a chat record, or the like) |

In another possible implementation, the host 30 may select the first logical unit or the second logical unit based on a directory to which the to-be-created new file belongs or a fact that the new file is used as a directory file.

Optionally, during installation of an application, for example, when the user downloads the application from an application store, a storage unit for file creation is determined according to a preset rule. For example, the application store indicates a directory to which a file of the application belongs. When a to-be-created new file is a hot file, the host 30 creates the new file into the second logical unit (LU 4) when creating the new file.

It should be understood that information about the directory to which the new file belongs or information about the new file used as the directory file may be included in the request message for creating the new file that is received by the host 30. This is not limited in this embodiment of this application.

Optionally, the host 30 may select the first logical unit or the second logical unit based on an application to which the new file belongs. For example, the application store indicates a range of a hot application. When a to-be-created new file belongs to a hot application, the host 30 creates the new file into the second logical unit (LU 4) when creating the new file.

Optionally, the host 30 may determine, based on a package name of a currently installed APP, a file to be written to the high-speed storage area.

For example, the host 30 may determine, based on the package name of the APP, to write, to the high-speed storage area, related data (a binary file) that is of a specific type in a specific path and that is of the APP whose package name is PKG. For example, the related data of the APP whose package name is PKG may include one or more of the following:

(1) base.apk file in/data/app/PKG/;

(2). so file in/data/app/PKG/lib;

(3) base.odex, base.vdex, and base.art files in/data/app/PKG/oat; and (4) .db file and the like in/data/data/PKG.

At an installation moment of the APP, the host 30 does not know a case in which the APP is used by a user after the APP is installed, that is, cannot obtain frequencies at which the host reads various types of data of the APP after the APP is installed. In this case, data to be written to the high-speed storage area can be directly determined based on the package name of the APP according to the foregoing method.

Optionally, the host 30 writes, to the high-speed storage area, a file of the APP whose package name is PKG, and may write another file of the APP to the conventional storage area, or write, based on a remaining capacity of the high-speed storage area, a part of a file other than the file of the specific type in the specific path to the high-speed storage area. This is not limited in this embodiment of this application.

It should be understood that, because performance and a service life of an SLC storage medium in the high-speed storage area are higher than those of a TLC storage medium in the conventional storage area, if the host 30 writes the file of the APP whose package name is PKG to the high-speed storage area, a running rate of the APP can be improved based on high performance of the high-speed storage area, to improve user experience. The another file of the APP is written to the conventional storage area, to avoid invalid occupation of the high-speed storage area by this type of file, save more space of the high-speed storage area for another application, improve a running rate of the another application, and improve user experience. In addition, in the method, the file written to the high-speed storage area only needs to be determined based on the package name of the APP, and access time or access frequency information of any file does not need to be stored. Therefore, an implementation process is more convenient. In another possible implementation, the host 30 may determine, based on access frequencies of various files of the installed APP, data to be written to the high-speed storage area.

For example, in this embodiment of this application, when the APP is installed or the APP is run, frequencies at which the host 30 reads various files of the APP are different. A frequency threshold may be set in descending order of frequencies at which the host 30 reads various files of the APP. A file whose read frequency of the host 30 is greater than or equal to the frequency threshold is referred to as a "hot file".

Optionally, after application opening behavior analysis is performed on a widely used APP, before installation, a mobile phone may obtain a common characteristic of a file path and a file type that are frequently accessed in an opening process after the APP is installed, to determine a hot file with a high read frequency of the host 30, and create the hot file into the high-speed storage area. A method for determining frequencies of various files of the APP is not limited in this embodiment of this application.

Optionally, the host 30 writes this type of hot file to the high-speed storage area, and may write other files of the APP to the conventional storage area, or write other files of the APP to some files with a high read frequency in descending order of read frequencies of the host based on a remaining capacity of the high-speed storage area. This is not limited in this embodiment of this application.

It should be understood that, because performance and a service life of the SLC storage medium in the high-speed storage area are higher than those of the TLC storage medium in the conventional storage area, if the host 30 creates the hot file into the high-speed storage area, a file read rate can be improved based on high performance of the high-speed storage area, to improve a running rate of the APP and improve user experience. In addition, a file with a low read frequency of the host 30 is created into the conventional storage area, to avoid invalid occupation of the high-speed storage area by this type of file, save more space of the high-speed storage area for another application, improve a running rate of the another application, and improve user experience.

In another possible implementation, the host 30 may determine, based on a quantity of APPs installed by a user, a file to be created into the high-speed storage area.

For different users, different quantities of APPs are installed on mobile phones. The users can be grouped into different groups based on quantities of APPs installed by the users. For example, a user who installs more than or equal to 100 APPs is marked as a heavy user; a user who installs more than or equal to 50 APPs and fewer than 100 APPs is marked as a medium user; and a user who installs fewer than 50 APPs is marked as a light user.

It should be understood that division into "heavy", "medium", and "light" herein is performed based on the quantities of APPs installed by the users. A user division manner is not limited in this embodiment of this application.

It should be further understood that a manner in which the host obtains the APP installed by the user is not limited in this embodiment of this application. Optionally, for example, when using a mobile phone, a user registers a user account on a server side provided by a manufacturer of the mobile phone, and installs 45 applications. If the user replaces the mobile phone, the user may continue to log in to the account on a new mobile phone. When user privacy is ensured, the host may obtain a quantity of applications installed by using the account, to classify the user as the light user.

The light user or the medium user installs a small quantity of APPs. For example, the quantity of installed APPs is less than or equal to 100. In this case, a capacity (1*o* GB) of the high-speed storage area can accommodate hot files of most of the 100 APPs, and the host may directly create hot files of all the APPs into the high-speed storage area. According to the method, the user can obtain performance gains of the high-speed storage area as soon as possible, and there is no need to wait for the application to be used for a period of time before being migrated to the high-speed storage area.

The heavy user installs a large quantity of APPs. For example, the quantity of installed APPs is greater than 100. In this case, a capacity (1*o* GB) of the high-speed storage area can accommodate only hot files of some APPs. In this case, a hot file of a frequently used APP may be directly created into the high-speed storage area based on frequencies at which the user has used various APPs. According to the method, for an APP frequently used by the user, performance gains of the high-speed storage area can be obtained, and user experience can be improved.

Scenario 2

In the foregoing descriptions, in a scenario in which the user installs the APP on the mobile phone, the host 30 may determine, according to different methods, the file created into the high-speed storage area. For files that have been created into the high-speed storage area and the conventional storage area, in a subsequent use process of a mobile phone, for different application scenarios, frequencies at which the files in the two storage areas are read by the host change.

For example, in a working time period from 09:00 to 18:00 in daytime, the user has a high probability of using an office APP installed on the mobile phone, but has a low probability of using a social APP such as Chat; and in a leisure time period from 18:00 to 23:00, the user has a low probability of using an office APP, but has a high probability of using a social APP such as Chat. If a file of the office APP is permanently written to the high-speed storage area, and a file of the social APP such as Chat is permanently written to the conventional storage area, the user has good use experience of the office APP in the working time period from 09:00 to 18:00 in daytime, and the user has poor use experience of the social APP in the leisure time period from 18:00 to 23:00. Alternatively, if a file of the office APP is permanently written to the conventional storage area, and a file of the social APP such as Chat is permanently written to the high-speed storage area, the user has poor use experience of the office APP in the working time period from 09:00 to 18:00 in daytime, and the user has good use experience of the social APP in the leisure time period from 18:00 to 23:00.

Therefore, an embodiment of this application further provides a data adjustment solution for a high-speed storage area and a conventional storage area, to meet different use requirements of users. In the following descriptions, step 705 to step 707 in the method 700 may be performed for a daily use scenario of the user.

705: The host 30 determines that a current scenario is a daily use scenario of the user.

706: The host 30 determines a file to be migrated to the high-speed storage area.

707: The host 30 migrates a file in the first logical unit to the second logical unit, and/or migrates a file in the second logical unit to the first logical unit.

The files in the high-speed storage area and the conventional storage area first need to be adjusted without affecting normal use by the user. Optionally, the host 30 may select an appropriate occasion to adjust storage locations of data stored in the conventional storage area and data stored in the high-speed storage area.

In a possible implementation, when the mobile phone is in a scenario in which the mobile phone is idle and is not used, based on a daily use habit of the user, the host migrates a file created in the conventional storage area to the high-speed storage area, and/or migrates a file created in the high-speed storage area to the conventional storage area.

For example, the host may determine a current usage status of the mobile phone, for example, the mobile phone is in a charging state or a screen-off state. Further, when the host determines that the mobile phone is in the charging state, or duration in which a screen of the mobile phone is off reaches preset duration, the host determines that the mobile phone is in a time period in which the mobile phone is idle and is not used, and determines the time period as the foregoing appropriate occasion. The host migrates the file created in the conventional storage area to the high-speed storage area, and/or migrates the file created in the high-speed storage area to the conventional storage area.

Optionally, the host may reallocate storage space of the high-speed storage area to each application based on habits of using a plurality of APPs by the user, and then adjust the file in the conventional storage area and the file in the high-speed storage area.

In a possible implementation, within a specific time period, K applications with highest use frequencies (or a largest quantity of access times) are selected from L applications in descending order of use frequencies (or quantities of access times) of the L applications installed by the user, sufficient storage space is allocated in the high-speed storage area, and all hot files of the K applications are loaded into the high-speed storage area.

It should be understood that L is greater than or equal to K, and L and K are positive integers. Quantities L and K may be determined based on application popularity obtained by collecting statistics about big data. Details are not described in this embodiment of this application.

If the hot files of the selected K applications are stored in the conventional storage area, the hot files of the K applications may be adjusted from the conventional storage area to the high-speed storage area when the mobile phone is idle and is not used.

Alternatively, if all the hot files of the selected K applications are stored in the high-speed storage area, and a capacity of the high-speed storage area is still sufficient, a specific quantity of applications may continue to be selected from remaining (L-K) applications in descending order of use frequencies (or quantities of access times) of the applications, and all the hot files of the K applications are written to the high-speed storage area.

According to the foregoing method, when the capacity of the high-speed storage area permits, a hot file of an application frequently used by the user or accessed by the user for a large quantity of times may be written to the high-speed storage area, to ensure high-performance experience brought by the high-speed storage area, so as to improve a running rate of the application and improve user experience.

In another possible implementation, when all the hot files of the selected K applications are stored in the high-speed storage area, and a capacity of the high-speed storage area is still sufficient, for remaining (L-K) applications, allocatable remaining total space of the high-speed storage area may be allocated to the remaining (L-K) applications according to a proportion of use frequencies (or quantities of access times) of the applications.

Optionally, when the remaining total space of the high-speed storage area is allocated to the remaining (L-K) applications proportionally, application hot files may be screened for the (L-K) applications according to the following policy. A specific screening process includes the following steps.

(1) First, collect samples, and select a large quantity of applications to traverse application opening time gains after a combination of different types of files is written to a fast storage area.

(2) Calculate a correlation coefficient between the different types of files and the application opening time gains, and use the correlation coefficient as an impact coefficient corresponding to a file type.

Table 2 is obtained by performing step (1) and step (2). Table 2 shows an example of a statistical table of a file type and an impact coefficient according to an embodiment of this application. As shown in Table 2, for example, file types respectively include base.apk, base.odex, base.vdex, base.art, and .so files. An application time gain after a file of each file type is written to the fast storage area is calculated.

It should be understood that, the file types listed in Table 2 are used as an example. The application opening time gain may be represented by a relative time gain or an absolute time gain. The relative gain may mean that for an application A, after a base.apk file of the application is written from the conventional storage area to the high-speed storage area, time can be saved when the user opens the application A. For example, if the time saved after the base.apk file of the application is written from the conventional storage area to the high-speed storage area is longer than time saved after a .so file of the application is written from the conventional storage area to the high-speed storage area, it may be considered that a time gain brought by adjusting the base.apk file to the high-speed storage area is greater, that is, the application A is opened faster.

The absolute time gain may mean that for an application A and an application B, if a base.apk file is stored in the conventional storage area, time consumed for opening the application A is 10 seconds (second, s), and time consumed for opening the application B is 30 s. After the base.apk file is written from the conventional storage area to the high-speed storage area, the time consumed for opening the application A is shortened by 2 s, and the time consumed for opening the application B is also shortened by 2 s. In this case, even if the time of opening the application A and the time of opening the application B each are shortened by 2 s, an absolute time gain of the application A is 2/10 and an absolute time gain of the application B is 2/30. Therefore, the absolute time gain of the application A is greater than the absolute time gain of the application B. In this case, writing the base.apk file of the application A from the conventional storage area to the high-speed storage area may obtain a greater time gain. A representation manner of the time gain is not limited in this embodiment of this application.

TABLE 2

| File type | Impact coefficient |
|---|---|
| base.apk | a |
| base.odex | b |
| base.vdex | c |
| base.art | d |
| .so | e |

(3) Calculate a file combination decision table.

For example, for the application A, based on a calculation result in Table 2, combinations of all types of files may be traversed, and an impact coefficient of each combination may be calculated. Table 3 shows an example of a statistical table of a file combination and an impact coefficient according to an embodiment of this application. For example, file combinations may include base.apk+base.odex, base.odex+ base.vdex, base.apk+base.odex+base.vdex, and the like, and a total size of all files in a file combination is correspondingly calculated. The file combinations are sorted in ascending order of sizes of the file combinations, that is, the sizes of the file combinations in Table 3 are Y1<Y2<Y3< . . . <Yk.

In addition, a sum of impact coefficients of all types of files in a file combination is correspondingly calculated. An envelope is obtained according to a principle that an impact coefficient X gradually increases as a size Y of a file combination increases, and a combination that does not comply with the principle is excluded. A file combination decision table shown in Table 3 is finally obtained, and an impact coefficient X of a file combination in Table 3 increases as a size Y of the file combination increases.

TABLE 3

| File type | Impact coefficient | Size of a file combination |
|---|---|---|
| base.apk + base.odex | X1 = a + b | Y1 |
| base.odex + base.vdex | X2 = b + c | Y2 |
| base.apk + base.odex + base.vdex | X3 = a + b + c | Y3 |
| . . . | . . . | . . . |
| base.apk + base.odex + . . . + . . . | Xk | Yk |

(4) Select a corresponding file combination based on a capacity y of the high-speed storage area.

Specifically, if available space of the high-speed storage area is limited, and a capacity allocated to the application A is y, a file combination whose size Y of the file combination is less than or equal to y and whose impact coefficient X is largest can be selected from the table, that is, an optimal file combination.

For example, if Y3 is exactly equal to the available capacity y of the high-speed storage area, X3>X2, and X3>X1, base.apk+base.odex+base.vdex is an optimal file combination. In this case, base.apk+base.odex+base.vdex of the application A is used as a hot file, and is written from the conventional storage area to the high-speed storage area, to ensure high-performance experience brought by the high-speed storage area, and obtain a maximum time gain.

Similarly, for a plurality of applications installed by a user, space of the high-speed storage area may be allocated to each application based on a frequency at which the user accesses each application, and a file combination decision table of each application is calculated. An optimal file combination is obtained from the file combination decision table and is used as a hot file, and is written from the conventional storage area to the high-speed storage area, to ensure high-performance experience brought by the high-speed storage area, and obtain a maximum time gain for each application.

According to the foregoing method, personalized dynamic adjustment is performed based on a use habit of the user, and idle time in which the mobile phone is in a charging state, a screen-off state, or the like is selected to adjust a file storage area, so as to effectively manage space of the high-performance high-speed storage area, ensure that a file combination with a maximum time gain is written to a limited capacity, and obtain an optimal gain improvement. In addition, the process of adjusting the storage area is imperceptible to the user, and normal use of the mobile phone by the user is not affected.

In the file creation and file reading processes described above, or in a file migration process between the conventional storage area and the high-speed storage area, the host 30 not only needs to accurately know a file creation location of each application, but also needs to manage the conventional storage area and the high-speed storage area.

It should be understood that in this embodiment of this application, disks to which the LU 4 and the LU 3 are mapped are mounted on a same directory of the file system. Therefore, a file of an application may be migrated between the LU 3 and the LU 4. For a user, the user does not need to perceive the migration process, and use of the user is not affected.

A process in which the system creates a new file may correspond to different implementation processes. For example, the system may open a buffer through an open interface, perform different results based on parameters, and create a file if there is no file. For example, content of the new file is written through a write interface, and the new file is closed through a close interface.

In a possible implementation, in a process of creating the new file into the file system, when the new file needs to be created into an SLC storage area (a high-speed storage area), the system may first invoke an open interface or a create interface to create the new file and obtain a descriptor fd of the new file; then invoke an ioctl interface to input a parameter to specify that content of the new file needs to be flushed to a disk to which the SLC storage area is mapped; and invoke a write interface to write the content of the new file to a memory buffer corresponding to the descriptor fd, and invoke a close interface to close the descriptor fd of the new file; and finally, the kernel file system flushes data in the memory back to the high-speed storage area of the disk on an appropriate occasion, so that the content of the new file is actually flushed to the disk.

In a process of creating the new file into the file system, when the new file needs to be created into a TLC storage area (a conventional storage area), the system may first invoke an open interface or a create interface to create the new file and obtain a descriptor fd of the new file; then invoke an ioctl interface to input a parameter to specify that content of the new file needs to be flushed to a slow disk to which the TLC storage area is mapped; and invoke a write interface to write the content of the new file to a memory buffer corresponding to the descriptor fd, and invoke a close interface to close a file descriptor, that is, the descriptor fd of the new file; and finally, the kernel file system flushes data in the memory back to the conventional storage area of the disk on an appropriate occasion, so that the content of the new file is actually flushed to the disk.

It should be understood that the process described above is a possible process of creating the new file and flushing the content of the new file to the disk, or may be implemented in different manners. This is not limited in this embodiment of this application. In this embodiment of this application, the interface invoked by the system does not include information about any logical unit LU. For a user, interfaces for accessing files by various applications do not need to be changed.

For example, this embodiment of this application provides four new interfaces of the file system, to manage the high-speed storage area.

Figure 8:
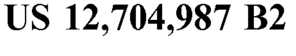
FIG. 8 is a schematic diagram of an example of a file system management module according to an embodiment of this application.
Figure 8:
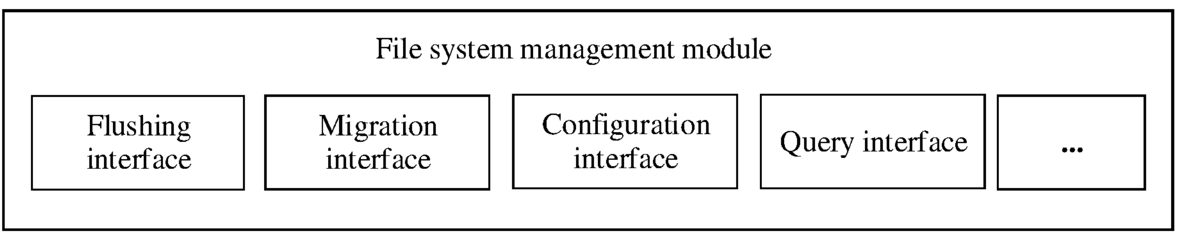

For example, FIG. 8 is a schematic diagram of an example of a file system management module according to an embodiment of this application. As shown in FIG. 8, for the file system management module at the kernel layer of the host 30 in FIG. 2, this application provides a plurality of interfaces with different functions, for example, a configuration interface, a query interface, a write interface, and a migration interface.

Specifically, the configuration interface is configured to configure a storage form conversion mode of a high-speed storage area in real time. The configuration interface may configure the storage form conversion mode of the high-speed storage area in real time. A storage form conversion direction and a conversion service life value of the high-speed storage area may be adjusted by using a capability of the configuration interface.

For example, an ioctl interface is designed based on a new open source flash friendly file system (flash friendly file system, F2FS). In a specific implementation process, a newly added cmd code F2FS_IOC_SET_TZ_STATUS_IOR (F2FS_IOCTL_MAGIC, 20, struct tz_status) may be used. A tz_status structure includes information about a high-speed storage area that needs to be configured, for example, SLC storage form information and capacity information.

The query interface is configured to query usage status information of the high-speed storage area in real time. The query interface may query the usage status information of the high-speed storage area in real time, for example, space usage, a remaining capacity, a remaining service life value, and storage form conversion information of the high-speed storage area.

For example, an ioctl interface is designed based on an F2FS. In a specific implementation process, a newly added cmd code F2FS_IOC_GET_TZ_STATUS_IOR (F2FS_IOCTL_MAGIC, 20, struct tz_status) may be used. A tz_status structure includes usage status information of a high-speed storage area that needs to be queried.

Figure 9:
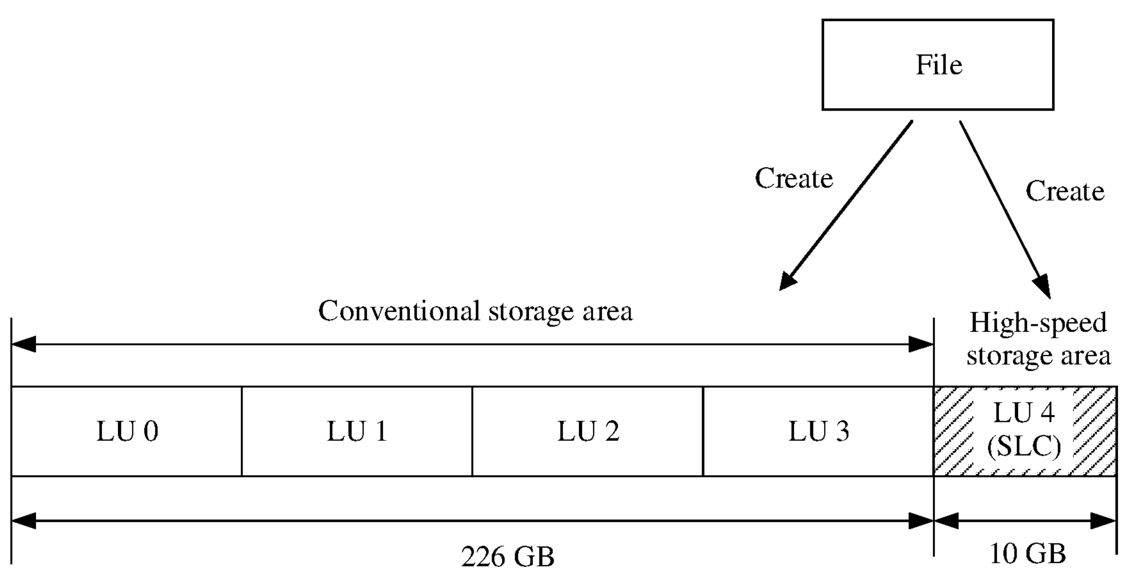
FIG. 9 is a schematic diagram of another example of a file creation process according to an embodiment of this application.

The write interface may also be referred to as a "flushing interface", and is configured to create a file in the high-speed storage area. When creating data, the host may determine whether the data is stored in the high-speed storage area or the conventional storage area. FIG. 9 is a schematic diagram of another example of a file creation process according to an embodiment of this application. A write interface is used, and a specific rule and policy are used. As shown in FIG. 9, an appropriate file is selected and placed in a high-speed storage area, and then another file is written to a conventional storage area.

For example, an ioctl interface is designed based on an F2FS. In a specific implementation process, a cmd code F2FS_IOC_SET_TZ_KEY_FILE_IOW (F2FS_IOCTL_MAGIC, 16, _u32) may be newly added. When a file is flushed to a disk, a descriptor attribute of the file is synchronously configured. 0 indicates that the file is flushed to the conventional storage area, and 1 indicates that the file is flushed to the high-speed storage area.

Figure 10:
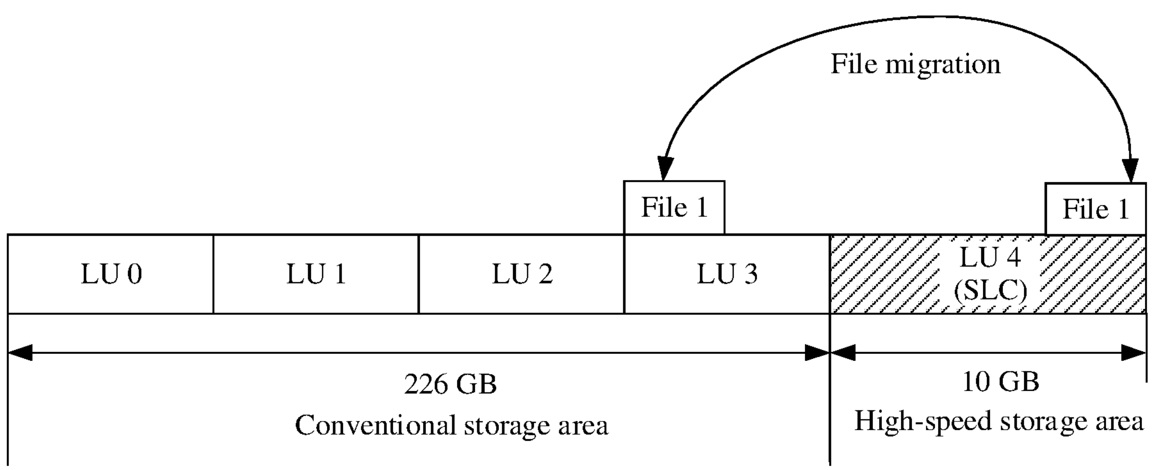
FIG. 10 is a schematic diagram of another example of a file migration process according to an embodiment of this application.

The migration interface is configured to: migrate a file from the high-speed storage area to the conventional storage area, or migrate a file from the conventional storage area to the high-speed storage area, that is, migrate the file between the high-speed storage area and the conventional storage area. Adjustment is made based on changes of a use behavior habit of the user and file importance by using this capability, and an appropriate occasion is selected to migrate a file. FIG. 10 is a schematic diagram of another example of a file migration process according to an embodiment of this application. As shown in FIG. 10, a file 1 may be adjusted from a high-speed storage area to a conventional storage area, or may be adjusted from the conventional storage area to the high-speed storage area, that is, may be migrated between the high-speed storage area and the conventional storage area.

For example, an ioctl interface is designed based on an F2FS. In a specific implementation process, a cmd code F2FS_IOC_MIGRATE_TZ_KEY_FILE_IOW (F2FS_IOCTL_MAGIC, 22, _u32) may be newly added. When a file is flushed to a disk, a descriptor attribute of the file is synchronously configured. 0 indicates that the file is migrated from the conventional storage area to the high-speed storage area, and 1 indicates that the file is migrated from the high-speed storage area to the conventional storage area.

The plurality of interfaces described above are designed, so that a process of configuring the storage system, creating the file, and reading the file can be implemented, and a process of migrating the file between the conventional storage area and the high-speed storage area can be implemented. In this way, in various different scenarios, a running speed of the system is further improved when requirements on performance, a service life, and a capacity of the storage system are considered.

It should be understood that the storage system provided in this embodiment of this application may be further widely applied to a scenario in which high storage performance is required in the future. For example, the storage system may meet a low-latency and high-performance requirement on access to a large amount of data in an AI scenario or a requirement on high-speed and frequent data exchange with a storage when a memory capacity is insufficient, a data transmission requirement of network bandwidth of 5th generation (5th generation, 5G) mobile network communication, and a data transmission requirement of a distributed terminal in an operating local area network or a home local area network.

In addition, an architecture to which the storage system may be applied is not limited to only a specific hybrid storage architecture, for example, a TLC or an SLC. Regardless of a medium used in a hybrid storage area, a quantity of medium types, a capacity, whether a capacity is fixed, or the like, user application data may be classified and stored by using this technical solution.

It may be understood that to implement the foregoing functions, the terminal device includes corresponding hardware and/or software modules for performing the functions. Algorithm steps in the examples described with reference to embodiments disclosed in this specification can be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application with reference to embodiments, but it should not be considered that the implementation goes beyond the scope of this application.

In embodiments, the terminal device may be divided into functional modules based on the foregoing method examples, for example, each functional module may be obtained through division based on each corresponding function, or two or more functions may be integrated into one processing module. The integrated module may be implemented in a form of hardware. It should be noted that, in embodiments, division into the modules is an example and is merely logical function division, and may be other division in an actual implementation.

It should be noted that all related content of the steps in the foregoing method embodiments may be cited in function descriptions of corresponding functional modules. Details are not described herein again.

The terminal device provided in embodiments may perform the foregoing data storage or data reading method.

Therefore, an effect the same as that of the foregoing implementation method can be achieved.

When an integrated unit is used, the terminal device may include a processing module, a storage module, and a communications module. The processing module may be configured to: control and manage an action of the terminal device. The storage module may be configured to support the terminal device in storing program code, data, and the like. The communications module may be configured to support communication between the terminal device and another device.

The processing module may be a processor or a controller. The processing module may implement or execute various example logical blocks, modules, and circuits described with reference to content disclosed in this application. The processor may alternatively be a combination of processors implementing a computing function, for example, a combination of one or more microprocessors or a combination of a digital signal processor (digital signal processor, DSP) and a microprocessor. The storage module may be a memory. The communications module may be specifically a device that interacts with another terminal device, such as a radio frequency circuit, a Bluetooth chip, or a Wi-Fi chip.

In an embodiment, when the processing module is a processor, and the storage module is a memory, the terminal device in this embodiment may be a device having the structure shown in FIG. 1.

An embodiment further provides a computer storage medium. The computer storage medium stores computer instructions. When the computer instructions are run on a terminal device, the terminal device is enabled to perform the foregoing related method steps, to implement the data storage and data reading method in the foregoing embodiments.

An embodiment further provides a computer program product. When the computer program product runs on a computer, the computer is enabled to perform the foregoing related steps, to implement the data storage and data reading method in the foregoing embodiments.

In addition, an embodiment of this application further provides an apparatus. The apparatus may be specifically a chip, a component, or a module. The apparatus may include a processor and a memory that are connected. The memory is configured to store computer executable instructions, and when the apparatus runs, the processor may execute the computer executable instructions stored in the memory, so that the chip performs the data storage and data reading method in the foregoing method embodiments.

The terminal device, the computer storage medium, the computer program product, and the chip provided in embodiments each are configured to perform the corresponding method provided above. Therefore, for beneficial effects that can be achieved by the terminal device, the computer storage medium, the computer program product, and the chip, refer to the beneficial effects in the corresponding method provided above. Details are not described herein again.

Based on descriptions of the foregoing implementations, a person skilled in the art may understand that, for the purpose of convenient and brief descriptions, division into the foregoing functional modules is merely used as an example for description. In actual application, the foregoing functions can be allocated to different functional modules and implemented based on a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, division into the modules or the units is merely logical function division and may be other division in an actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in a form of a software functional unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods described in embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art in the technical scope disclosed in this application shall fall within the protection scope of this application. Therefore, the protection scope of this application shall be subject to the protection scope of the claims.

What is claimed is:

1. A method, wherein the method is applied to an electronic device comprising a processor and a universal flash storage (UFS), and the method comprises:

configuring a data storage form of a first logical unit in the UFS as a first storage form and a data storage form of a second logical unit in the UFS as a second storage form, wherein the first logical unit and the second logical unit are mounted on a same directory of a file system, the first storage form is different from the second storage form, and read/write performance of the second storage form is higher than read/write performance of the first storage form;

determining first information in response to a request for creating a new file in the UFS;

selecting the first logical unit or the second logical unit based on the first information;

creating the new file in a selected logical unit;

obtaining information about a quantity of applications installed by a user on the electronic device;

determining whether the quantity of applications installed by the user is less than a second threshold;

migrating, based on the quantity of applications installed by the user being determined to be less than the second threshold, a first file in the first logical unit to the second logical unit; and arranging, based on the quantity of applications installed by the user being determined to be greater than or equal to the second threshold, the applications installed by the user in a descending order of use frequencies of the user, determining hot files of first K applications from the arranged applications based on a capacity of the second logical unit, the hot files of the first K applications having use frequencies satisfying a condition, and migrating the hot files of the first K applications to the second logical unit, wherein K is a positive integer.

2. The method according to claim 1, wherein the first information comprises file type information of the new file;

the first information comprises information about a directory to which the new file belongs;

when the new file is used as a directory file, the first information comprises information about the directory file; or the first information comprises information about an application to which the new file belongs.

3. The method according to claim 2, wherein the information about the application to which the new file belongs comprises an application package name corresponding to the application to which the new file belongs.

4. The method according to claim 1, wherein when the hot files of the first K applications in the applications installed by the user have been created in the second logical unit, and the capacity of the second logical unit is greater than or equal to a third threshold, the method further comprises:

obtaining N applications other than the first K applications in the applications installed by the user, and determining M file sets from the N applications, wherein each of the M file sets comprises at least one file of the N applications, wherein N is a positive integer;

calculating M corresponding time gains of separately creating the M file sets into the second logical unit, wherein the M corresponding time gains are relative time gains or absolute time gains, wherein M is a positive integer;

determining M impact coefficients of the M file sets based on the M file sets and the M corresponding time gains; and arranging the M impact coefficients in a descending order, determining first S impact coefficients from the arranged M impact coefficients based on the capacity of the second logical unit and sizes of the M file sets, and creating, into the second logical unit, S file sets corresponding to the first S impact coefficients, wherein S is a positive integer.

5. The method according to claim 1, wherein the method further comprises:

configuring a storage form conversion mode of the second logical unit, the storage form conversion mode indicating whether the second logical unit is convertible from one form to another form.

6. The method according to claim 5, wherein the storage form conversion mode of the second logical unit comprises one of following:

the second logical unit is fixed in the second storage form;

when storage space of the second logical unit is less than a fifth threshold, the second logical unit is unidirectionally convertible from the second storage form to the first storage form; or when the storage space of the second logical unit is less than the fifth threshold, the second logical unit is convertible from the second storage form to the first storage form, and when the storage space of the second logical unit is greater than or equal to the fifth threshold, the second logical unit is convertible from the first storage form to the second storage form.

7. The method according to claim 1, wherein the first storage form comprises a triple-level cell (TLC), and the second storage form comprises a single-level cell (SLC);

the first storage form comprises a multi-level cell (MLC), and the second storage form comprises an SLC;

the first storage form comprises a quad-level cell (QLC), and the second storage form comprises an SLC;

the first storage form comprises a TLC, and the second storage form comprises an MLC;

the first storage form comprises a QLC, and the second storage form comprises an MLC; or the first storage form comprises a QLC, and the second storage form comprises a TLC.

8. The method according to claim 1, wherein the method further comprises:

sending, by the processor, a first instruction to a controller in the UFS, wherein the first instruction comprises start addresses and end addresses of a plurality of logical units in the UFS;

determining, by the controller in the UFS, the first logical unit and the second logical unit in response to the first instruction based on the start addresses and the end addresses of the plurality of logical units in the UFS; and sending, by the processor, a second instruction to the controller in the UFS, and configuring, by the controller in the UFS in response to the second instruction, the data storage form of the first logical unit as the first storage form and the data storage form of the second logical unit as the second storage form, wherein the first logical unit is mapped to a common system disk, the second logical unit is mapped to a fast system disk, and files in the common system disk and the fast system disk are mounted on the same directory of the file system.

9. An electronic device comprising:

a universal flash storage (UFS); and a processor in communication with the UFS, and configured to:

configure a data storage form of a first logical unit in the UFS as a first storage form and a data storage form of a second logical unit in the UFS as a second storage form, wherein the first logical unit and the second logical unit are mounted on a same directory of a file system, the first storage form is different from the second storage form, and read/write performance of the second storage form is higher than read/write performance of the first storage form;

determine first information in response to a request for creating a new file in the UFS;

select the first logical unit or the second logical unit based on the first information create the new file in a selected logical unit;

obtain information about a quantity of applications installed by a user on the electronic device;

determine whether the quantity of applications installed by the user is less than a second threshold;

migrate, based on the quantity of applications installed by the user being determined to be less than the second threshold, a first file in the first logical unit to the second logical unit; and arrange, based on the quantity of applications installed by the user being determined to be greater than or equal to the second threshold, the applications installed by the user in a descending order of use frequencies of the user, determine hot files of first K applications from the arranged applications based on a capacity of the second logical unit, the hot files of the first K applications having use frequencies satisfying a condition, and migrate the hot files of the first K applications to the second logical unit, wherein K is a positive integer.

10. The electronic device according to claim 9, wherein the first information comprises file type information of the new file;

the first information comprises information about a directory to which the new file belongs;

when the new file is used as a directory file, the first information comprises information about the directory file; or the first information comprises information about an application to which the new file belongs.

11. The electronic device according to claim 10, wherein the information about the application to which the new file belongs comprises an application package name corresponding to the application to which the new file belongs.

12. The electronic device according to claim 9, wherein the first storage form comprises a triple-level cell (TLC), and the second storage form comprises a single-level cell (SLC);

the first storage form comprises a multi-level cell (MLC), and the second storage form comprises an SLC;

the first storage form comprises a quad-level cell (QLC), and the second storage form comprises an SLC;

the first storage form comprises a TLC, and the second storage form comprises an MLC; or the first storage form comprises a QLC, and the second storage form comprises an MLC; or the first storage form comprises a QLC, and the second storage form comprises a TLC.

13. The electronic device according to claim 9, wherein the UFS is configured to:

receive a first instruction, wherein the first instruction comprises start addresses and end addresses of a plurality of logical units in the UFS;

determine the first logical unit and the second logical unit in response to the first instruction based on the start addresses and the end addresses of the plurality of logical units in the UFS; and receive a second instruction, and configure, in response to the second instruction, the data storage form of the first logical unit as the first storage form and the data storage form of the second logical unit as the second storage form, wherein the first logical unit is mapped to a common system disk, the second logical unit is mapped to a fast system disk, and files in the common system disk and the fast system disk are mounted on the same directory of the file system.

14. A non-transitory computer readable storage medium, comprising computer instructions, wherein when the computer instructions are run on an electronic apparatus, the electronic apparatus is caused to perform operations comprising:

configuring a data storage form of a first logical unit in a universal flash storage (UFS) as a first storage form and a data storage form of a second logical unit in the UFS as a second storage form, wherein the first logical unit and the second logical unit are mounted on a same directory of a file system, the first storage form is different from the second storage form, and read/write performance of the second storage form is higher than read/write performance of the first storage form;

determining first information in response to a request for creating a new file in the UFS;

selecting the first logical unit or the second logical unit based on the first information;

creating the new file in a selected logical unit;

obtaining information about a quantity of applications installed by a user on an electronic device;

determining whether the quantity of applications installed by the user is less than a second threshold;

migrating, based on the quantity of applications installed by the user being determined to be less than the second threshold, a first file in the first logical unit to the second logical unit; and arranging, based on the quantity of applications installed by the user being determined to be greater than or equal to the second threshold, the applications installed by the user in a descending order of use frequencies of the user, determining hot files of first K applications from the arranged applications based on a capacity of the second logical unit, the hot files of the first K applications having use frequencies satisfying a condition, and migrating the hot files of the first K applications to the second logical unit, wherein K is a positive integer.

15. The non-transitory computer readable storage medium according to claim 14, wherein the first information comprises information about a directory to which the new file belongs.

16. The non-transitory computer readable storage medium according to claim 14, wherein the new file is used as a directory file, and the first information comprises information about the directory file.

17. The non-transitory computer readable storage medium according to claim 14, wherein the first information comprises information about an application to which the new file belongs.

18. The non-transitory computer readable storage medium according to claim 17, wherein the information about the application to which the new file belongs comprises an application package name corresponding to the application to which the new file belongs.

19. The non-transitory computer readable storage medium according to claim 14, wherein the first storage form comprises a triple-level cell (TLC), and the second storage form comprises a single-level cell (SLC).

20. The non-transitory computer readable storage medium according to claim 14, wherein the first storage form comprises a multi-level cell (MLC), and the second storage form comprises a single-level cell (SLC).

* * * * *